US011066073B2

(12) United States Patent
Ishioka

(10) Patent No.: US 11,066,073 B2
(45) Date of Patent: Jul. 20, 2021

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventor: Atsushi Ishioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 285 days.

(21) Appl. No.: 16/082,321

(22) PCT Filed: Mar. 8, 2017

(86) PCT No.: PCT/JP2017/009322
§ 371 (c)(1),
(2) Date: Sep. 5, 2018

(87) PCT Pub. No.: WO2017/159509
PCT Pub. Date: Sep. 21, 2017

(65) Prior Publication Data

US 2019/0092333 A1 Mar. 28, 2019

(30) Foreign Application Priority Data

Mar. 15, 2016 (JP) ............................ JP2016-051332

(51) Int. Cl.
*B60W 30/18* (2012.01)
*B60W 30/095* (2012.01)
(Continued)

(52) U.S. Cl.
CPC ....... *B60W 30/18163* (2013.01); *B60Q 1/346* (2013.01); *B60Q 1/488* (2013.01);
(Continued)

(58) Field of Classification Search
CPC ......... B60W 30/18163; B60W 30/095; B60W 30/09; B60W 30/0956; B60W 2554/801; B60Q 1/488; B60Q 1/346
(Continued)

(56) References Cited

U.S. PATENT DOCUMENTS 5,521,579 A 5/1996 Bernhard
2009/0088925 A1 * 4/2009 Sugawara ............ B60W 30/12 701/41
(Continued)

FOREIGN PATENT DOCUMENTS

DE 102006020631 11/2007
JP 11-345393 12/1999
(Continued)

OTHER PUBLICATIONS

Japanese Office Action for Japanese Patent Application No. 2018-505862 dated Jun. 18, 2019.
(Continued)

*Primary Examiner* — Muhammad Shafi
(74) *Attorney, Agent, or Firm* — Amin, Turocy & Watson, LLP

(57) ABSTRACT

A vehicle control system includes a controller that sets a target area, and that executes a lane change of the host vehicle toward the set target area, the target area being an area which is a target for the host vehicle when performing the lane change to an adjacent lane which is adjacent to an own traffic lane on which the host vehicle is traveling, and a direction indicator controller that determines a timing for operating a direction indicator installed on the host vehicle on the basis of a relative relationship between the host vehicle and a vehicle that is traveling in front of or at rear of the target area set by the controller and the host vehicle.

18 Claims, 15 Drawing Sheets

(51) Int. Cl.
*B60Q 1/48* (2006.01)
*B60Q 1/34* (2006.01)
*B60W 30/09* (2012.01)

(52) U.S. Cl.
CPC .......... *B60W 30/09* (2013.01); *B60W 30/095* (2013.01); *B60W 30/0956* (2013.01); *B60W 2554/801* (2020.02)

(58) Field of Classification Search
USPC .......................................................... 701/301
See application file for complete search history.

(56) References Cited

U.S. PATENT DOCUMENTS

2013/0194086 A1* 8/2013 Igarashi ............. G06K 9/00805 340/435
2013/0226433 A1 8/2013 Tominaga et al.
2013/0297172 A1* 11/2013 Ariga ..................... G08G 1/166 701/70
2015/0070161 A1* 3/2015 Mizuno .................... B60Q 1/40 340/465

FOREIGN PATENT DOCUMENTS

| | | | |
|---|---|---|---|
| JP | 2002-279599 | | 9/2002 |
| JP | 2009-078735 | | 4/2009 |
| JP | 2010-095033 | * | 4/2010 |
| JP | 2013-177054 | | 9/2013 |
| JP | 2017-030436 | | 2/2017 |

OTHER PUBLICATIONS

International Search Report and Written Opinion for International Patent Application No. PCT/JP2017/009322 dated May 16, 2017, 10 pages.
Chinese Office Action for Chinese Patent Application No. 201780014932.3 dated Oct. 26, 2020.

* cited by examiner

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

Priority is claimed on Japanese Patent Application No. 2016-051332, filed Mar. 15, 2016, the content of which is incorporated herein by reference.

BACKGROUND ART

In recent years, research has been performed on a technology for automatically performing lane change during traveling on the basis of a relative relationship between a host vehicle and a neighboring vehicle. In this regard, a traveling assisting device is known which includes an assistance starting unit configured to start assistance of lane change on the basis of an input of an input device, a detection unit configured to detect a relative distance and a relative speed between the host vehicle and another vehicle, a calculation unit configured to calculate a collision risk degree with respect to another vehicle when the host vehicle changes lanes on the basis of the relative distance and the relative speed detected by the detection unit, a first determining unit configured to determine whether the lane change is possible on the basis of the relative distance, the relative speed and the collision risk degree, a determining unit configured to determine a target space in which a lane is changed on the basis of the relative distance and the relative speed when the first determining unit determines that the lane change is not possible, a second determining unit configured to determine whether a space in which a lane change can be performed is present in the target space, a setting unit configured to set a target speed toward a lane change standby position when the second determining unit determines that a space is not present and set a target speed toward a lane-changeable position when the second determining unit determines that a space is present, and a control unit configured to control a speed of the host vehicle such that it reaches a target speed (for example, see Patent Literature 1).

CITATION LIST

Patent Literature

Patent Literature 1

Japanese Unexamined Patent Application, First Publication No. 2009-078735

SUMMARY OF INVENTION

Technical Problem

However, in the technology of the related art, when lane change is performed, it may not be possible to show a direction of lane change to the surrounding vehicles at an appropriate timing.

An aspect of the present invention is directed to providing a vehicle control system, a vehicle control method, and a vehicle control program, in which an advance notice of lane change can be performed at an appropriate timing.

Solution to Problem (1) A vehicle control system according to an aspect of the present invention includes: a controller that sets a target area, and that executes a lane change of a host vehicle toward the set target area, the target area being an area which is a target for the host vehicle when performing the lane change to an adjacent lane which is adjacent to an own traffic lane on which the host vehicle is traveling; and a direction indicator controller that determines a timing for operating a direction indicator installed on the host vehicle on the basis of a relative relationship between the host vehicle and a vehicle that is traveling in front of or at rear of the target area set by the controller.

(2) In the aspect of (1), the relative relationship may be a relative positional relationship between a position of the direction indicator and a reference position on the vehicle that is traveling in front of or at rear of the target area.

(3) In the aspect of (2), in a case the target area set by the controller is present at rear of a reference position of the host vehicle, the direction indicator controller may determine a timing to operate the direction indicator to a timing or after in which a position of the direction indicator becomes rearward than a reference position of a vehicle which is traveling in front of the target area in an advance direction of the host vehicle.

(4) In the aspect of (2) or (3), in a case the target area set by the controller is present in front of a reference position on the host vehicle, the direction indicator controller may determine a timing to operate the direction indicator to a timing or after in which a position of the direction indicator becomes forward than a reference position of a vehicle which is traveling at rear of the target area in the advance direction of the host vehicle.

(5) In the aspect of any one of (1) to (4), the direction indicator controller may change a reference position of a vehicle that is traveling in front of or at rear of the target area on the basis of a speed of the host vehicle and a speed of the vehicle that is traveling in front of or at rear of the target area.

(6) In the aspect of (5), the direction indicator controller may set the reference position for the vehicle traveling at rear of the target area so as to approach closer to a rear end side of the vehicle traveling at rear of the target area as a relative speed of the host vehicle with respect to a speed of the vehicle traveling at rear of the target area increases.

(7) In the aspect of (5) or (6), the direction indicator controller may set the reference position for the vehicle traveling in front of the target area so as to approach closer to a front end side of the vehicle traveling in front of the target area as a relative speed of the host vehicle with respect to the vehicle traveling in front of the target area increases as a negative value.

(8) In the aspect of any one of (1) to (7), the controller may determine whether the lane change of the host vehicle to the set target area is possible, and when it is determined that the lane change is not possible, changes the target area to in front of the vehicle traveling in front of the set target area or to at rear of the vehicle traveling at rear of the set target area, and when the target area is changed by the controller, the direction indicator controller may determine to continuously operate the direction indicator installed on the host vehicle until the lane change of the host vehicle with respect to the changed target area is terminated.

(9) In the aspect of any one of (1) to (8), the direction indicator controller may determine to operate the direction indicator on the rear side of the host vehicle among the direction indicators in a case an inter-vehicle distance between the vehicle traveling in front of the target area and the vehicle traveling at rear of the target area gets larger than before the operation of the direction indicator and further, after the lane change to the target area is terminated.

(10) In the aspect of any one of (2) to (9), the reference position of the vehicle traveling in front of or at rear of the target area may be a position of a driver.

(11) A method according to an aspect of the present invention is installed on a computer configured to control a vehicle, the method including: setting a target area that is a target when executing a lane change of a host vehicle to an adjacent lane which is adjacent to an own traffic lane on which the host vehicle is traveling; executing the lane change of the host vehicle toward the set target area; and determining a timing for operating a direction indicator installed on the host vehicle on the basis of a relative relationship between the host vehicle and a vehicle traveling in front of or at rear of the set target area.

A vehicle control program according to an aspect of the present invention is installed in an in-vehicle computer and configured to perform: processing of setting a target area that is a target when executing a lane change of a host vehicle to an adjacent lane which is adjacent to an own traffic lane on which the host vehicle is traveling; processing of executing the lane change of the host vehicle toward the set target area; and processing of determining a timing for operating a direction indicator installed on the host vehicle on the basis of a relative relationship between the host vehicle and a vehicle traveling in front of or at rear of the set target area.

Advantageous Effects of Invention

According to the aspects of (1), (2), (10), (11) and (12), a timing for operating the direction indicator installed on the host vehicle is determined on the basis of a relative relationship between the host vehicle and the vehicle that is traveling in front of or at rear of the target area. For this reason, an advance notice of lane change can be performed at an appropriate timing.

According to the aspect of (3), in a case the target area is present at rear of the reference position on the host vehicle, a timing to operate the direction indicator is determined to a timing or after in which a position of the direction indicator becomes rearward than a reference position of the vehicle which is traveling in front of the target area in an advance direction of the host vehicle. For this reason, an advance notice of the lane change can be performed at a more appropriate timing.

According to the aspect of (4), in a case the target area is present in front of the reference position of the host vehicle, a timing to operate the direction indicator is determined to a timing or after in which a position of the direction indicator becomes forward than a reference position of the vehicle which is traveling at rear of the target area in the advance direction of the host vehicle. For this reason, an advance notice of the lane change can be performed at a more appropriate timing.

According to the aspects of (5) to (7), a reference position of the vehicle that is traveling in front of or at rear of the target area is changed on the basis of a speed of the host vehicle and a speed of the vehicle traveling in front of or at rear of the target area. For this reason, an advance notice of the lane change can be performed at a more appropriate timing.

According to the aspect of (8), when the lane change to the set target area is not possible, the target area is changed in front of the vehicle traveling in front of the set target area or at rear of the vehicle traveling at rear of the set target area, and the direction indicator installed on the host vehicle is determined to continuously operated until the lane change of the host vehicle with respect to the changed target area is terminated. For this reason, reliability of the lane change can be enhanced.

According to the aspect of (9), the direction indicator on the rear side of the host vehicle among the direction indicators is determined to be operated in a case an inter-vehicle distance between the vehicle traveling in front of the target area and the vehicle traveling at rear of the target area gets larger than before the operation of the direction indicator, and further, after the lane change to the target area is terminated. For this reason, it is possible to give polite consideration to neighboring vehicles.

DESCRIPTION OF EMBODIMENTS

Hereinafter, embodiments of a vehicle control system, a vehicle control method, and a vehicle control program of the present invention will be described with reference to the accompanying drawings.

<Configuration>

Figure 1:
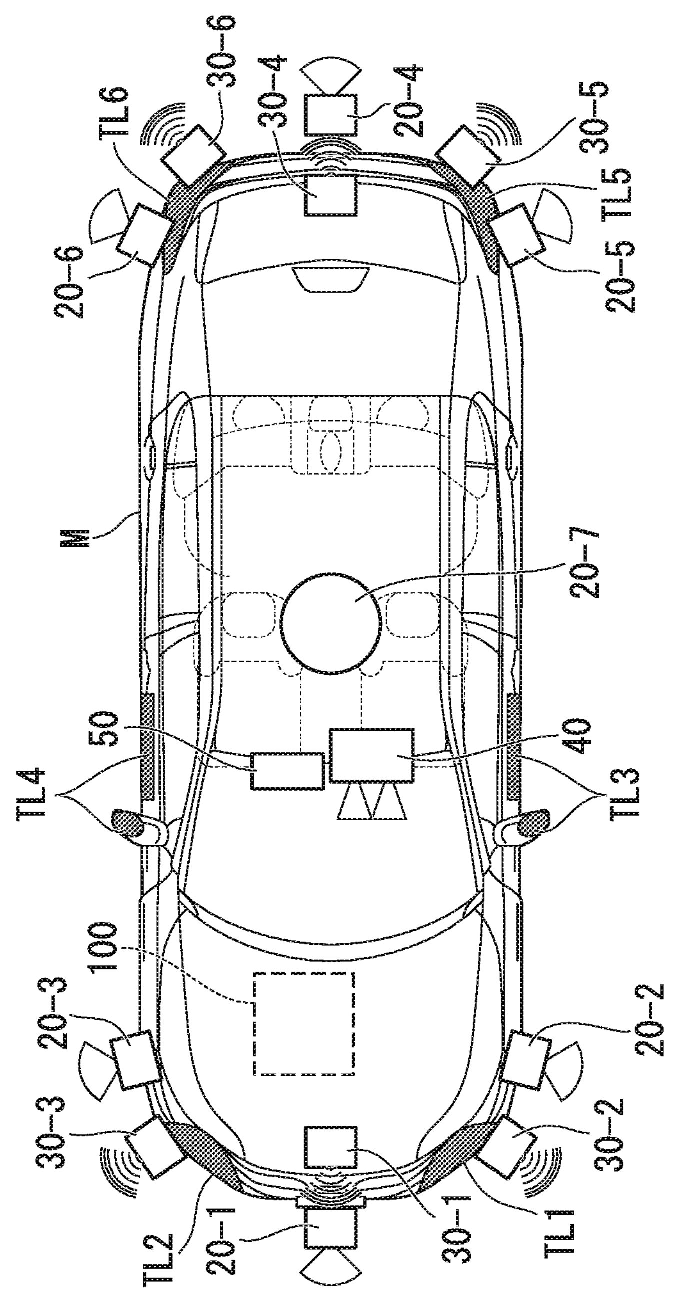
FIG. 1 is a figure showing components of a host vehicle.

FIG. 1 is a figure showing components of a vehicle on which a vehicle control system 100 of an embodiment is mounted (hereinafter, referred to as a host vehicle M). The vehicle on which the vehicle control system 100 is mounted is an automobile such as a two-wheeled, three-wheeled, or four-wheeled vehicle, or the like, and includes an automobile using an internal combustion engine such as a diesel engine, a gasoline engine, or the like, as a power source, an electric automobile using an electric motor as a power source, a hybrid automobile including both of an internal combustion engine and an electric motor, and so on. The electric automobile is driven using electric power discharged by a battery such as a secondary battery, a hydrogen fuel cell, a metal fuel cell, an alcohol fuel cell, or the like.

As shown in FIG. 1, sensors such as finders 20-1 to 20-7, radars 30-1 to 30-6, a camera 40, and so on, a navigation device 50, direction indicators TL1 to TL6, and the vehicle control system 100 are mounted on the host vehicle M.

The finders 20-1 to 20-7 use, for example, light detection and ranging or laser imaging detection and ranging (LIDAR) configured to measure scattered radiation with respect to radiated light and measure a distance to an object. For example, the finder 20-1 is attached to a front grille or the like, and the finders 20-2 and 20-3 are attached to side surfaces of a vehicle body, door mirrors, the insides of headlights, the vicinity of side lights, or the like. The finder 20-4 is attached to a trunk lid or the like, and the finders 20-5 and 20-6 are attached to side surfaces of the vehicle body, insides of tail lamps, or the like. The above-mentioned finders 20-1 to 20-6 have, for example, detection regions of about 150 degrees in a horizontal direction. In addition, the finder 20-7 is attached to a roof or the like.

The finder 20-7 has, for example, a detection region of 360 degrees in the horizontal direction.

The radars 30-1 and 30-4 are, for example, long-distance millimeter wave radars having a detection region in a depth direction that is wider than that of other radars. In addition, the radars 30-2, 30-3, 30-5 and 30-6 are middle-range millimeter wave radars having a detection region in the depth direction that is narrower than that of the radars 30-1 and 30-4.

Hereinafter, when the finders 20-1 to 20-7 are not distinguished from each other, they are simply referred to as "finders 20," and when the radars 30-1 to 30-6 are not distinguished from each other, they are simply referred to as "radars 30." The radar 30 detects an object using, for example, a frequency modulated continuous wave (FM-CW) method.

The camera 40 is a digital camera using a solid imaging element such as a charge coupled device (CCD), a complementary metal oxide semiconductor (CMOS), or the like. The camera 40 is attached to an upper section of a front windshield, a back surface of a rear-view mirror, or the like. For example, the camera 40 periodically repeatedly images a side in front of the host vehicle M. The camera 40 may be a stereo camera including a plurality of cameras.

The direction indicators TL1 to TL6 are operated under control by, for example, the vehicle control system 100. The direction indicators TL1 to TL6 include, for example, turn lamps configured to repeat lighting and lights-out (flickering) in an operation state, and put the light out in a non-operation state. Further, the direction indicators TL1 to TL6 may be turned on all the time in the operation state. For example, the direction indicators TL1 and TL2 are installed at a front end portion of a vehicle body such as insides of heat lamps or the like, the direction indicators TL3 and TL4 are installed at side surfaces, door mirrors, or the like, of the vehicle body, and the direction indicators TL5 and TL6 are installed at a rear end portion of the vehicle body such as insides of tail lamps. The direction indicators TL3 and TL4 may be integrated with side marker lamps, or the direction indicators TL5 and TL6 may be integrated with tail lamps such as hazard lamps or the like. Hereinafter, when the direction indicators TL1 to TL6 are not distinguished from each other, they are simply referred to as "direction indicators TL."

Further, the configuration shown in FIG. 1 is merely an example, and a part of the configuration may be omitted, or other components may be added.

Figure 2:
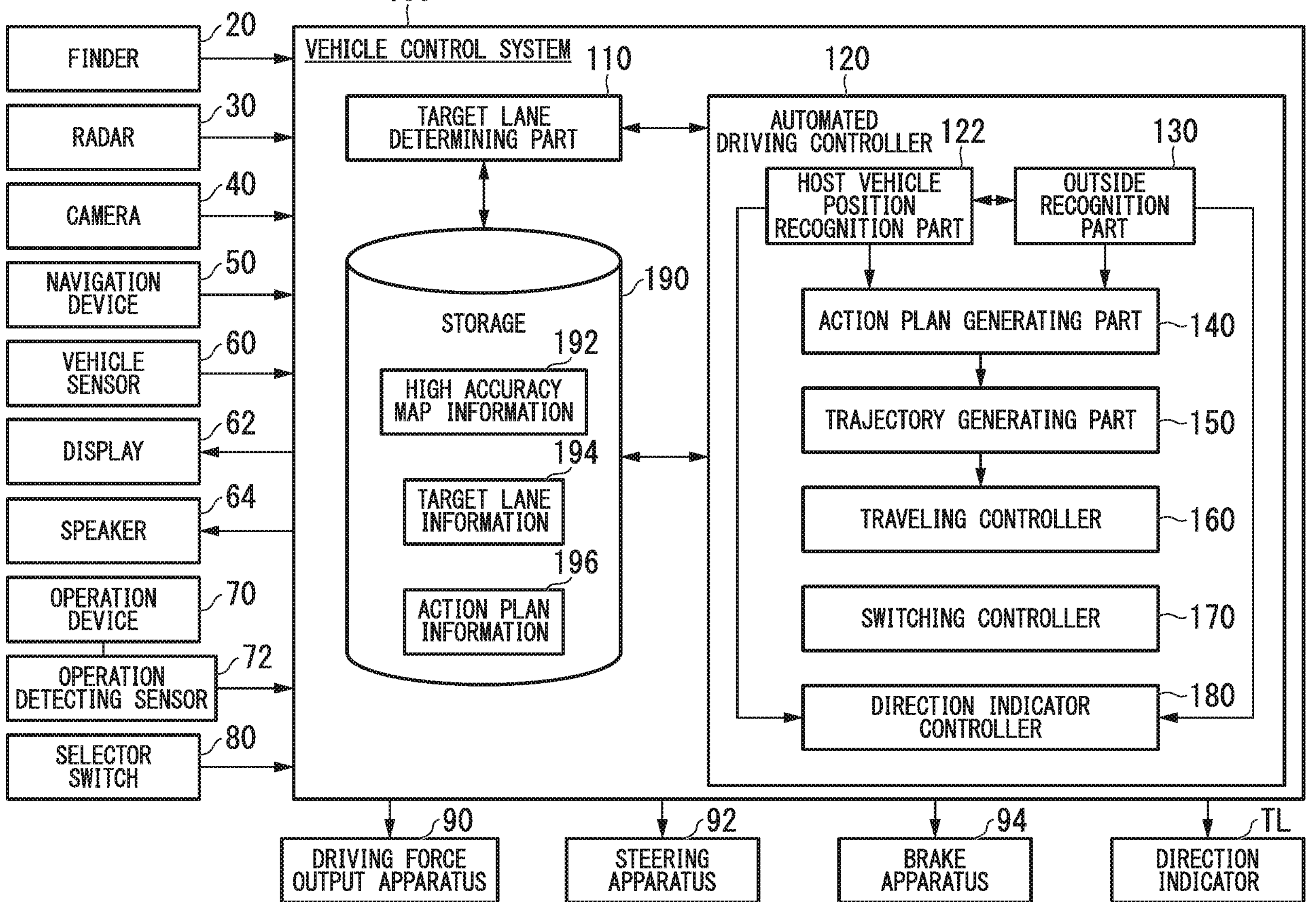
FIG. 2 is a functional configuration figure of the host vehicle.

FIG. 2 is a functional configuration figure of the host vehicle M on which the vehicle control system 100 according to the embodiment is mounted.

In addition to the finders 20, the radars 30 and the camera 40, the navigation device 50, a vehicle sensor 60, a display 62, a speaker 64, an operation device (a manipulator) 70 such as an accelerator pedal, a brake pedal, a shift lever (or a paddle shift), a steering wheel, or the like, an operation detecting sensor 72 such as an accelerator opening sensor, a brake pedaling amount sensor (a brake switch), a shift position sensor, a steering angle sensor (or a steering torque sensor), or the like, a selector switch 80, a driving force output apparatus 90 configured to output a driving force for traveling, a steering apparatus 92, a brake apparatus 94, and the vehicle control system 100 are mounted on the host vehicle M.

These devices or instruments are connected to each other by a multiplex communication line such as a controller area network (CAN) communication line or the like, a serial communication line, a wireless communication network, or the like. The exemplified operation device is merely an example, a joystick, a button, a dial switch, a graphical user interface (GUI) switch, or the like, may be mounted on the host vehicle M. Further, the vehicle control system in the claims may include not only the vehicle control system 100 but also a configuration other than the vehicle control system 100 (the finders 20 or the like) among the configurations shown in FIG. 2.

The navigation device 50 has a global navigation satellite system (GNSS) receiver, map information (navigation map), a touch panel type display device serving as a user interface, a speaker, a microphone, or the like. The navigation device 50 identifies a position of the host vehicle M using a GNSS receiver, and derives a route from a position thereof to a destination designated by a user.

The route derived by the navigation device 50 is provided to a target lane determining part 110 of the vehicle control system 100. A position of the host vehicle M may be identified or complemented by the inertial navigation system (INS) using the output of the vehicle sensors 60.

In addition, the navigation device 50 performs guidance for a route to a destination using speech or navigation display when the vehicle control system 100 operates in a manual driving mode.

Further, the configuration for identifying the position of the host vehicle M may be installed independently from the navigation device 50.

In addition, the navigation device 50 may be realized by a function of a terminal device such as a smartphone, a tablet terminal, or the like, owned by a user. In this case, transmission and reception of information through wireless or wired communication between the terminal device and the vehicle control system 100 are performed.

The vehicle sensor 60 includes a vehicle speed sensor configured to detect a vehicle speed, an acceleration sensor configured to detect an acceleration, a yaw rate sensor configured to detect an angular speed around a vertical axis, an azimuth sensor configured to detect a direction of the host vehicle M, and so on.

The display 62 displays information as an image. The display 62 includes, for example, a liquid crystal display (LCD), an organic electroluminescence (EL) display device, a head-up display, or the like. The display 62 may be a display included in the navigation device 50, or a display of an installment panel configured to display a state (a speed or the like) of the host vehicle M. The speaker 64 outputs information as speech.

The operation detecting sensor 72 detects an operation amount of the operation device 70. For example, the operation detecting sensor 72 outputs an accelerator opening degree, a brake pedaling amount, a shift position, a steering angle, a steering torque, or the like, as detection results, to the vehicle control system 100. Further, instead of this, the detection results of the operation detecting sensor 72 according to a driving mode may be directly output to the driving force output apparatus 90, the steering apparatus 92, or the brake apparatus 94.

The selector switch 80 is a switch operated by an occupant in the vehicle. The selector switch 80 receives an operation of an occupant in the vehicle, generates a driving mode designating signal that designates a driving mode of the host vehicle M, and outputs the driving mode designating signal to a switching controller 170. The selector switch 80 may be either a GUI switch or a mechanical switch.

The driving force output apparatus 90 outputs a traveling driving force (torque) for driving the vehicle to a driving wheel. The driving force output apparatus 90 includes, for example, an engine, a gear box, and an engine electric control unit (ECU) configured to control the engine when the host vehicle M is an automobile using an internal combustion engine as a power source. In addition, when the host vehicle M is an electric automobile using an electric motor as a power source, the driving force output apparatus 90 includes a traveling motor and a motor ECU configured to control the traveling motor. In addition, when the host vehicle M is a hybrid automobile, the driving force output apparatus 90 includes an engine, a gear box, an engine ECU, a traveling motor and a motor ECU.

When the driving force output apparatus 90 includes only an engine, the engine ECU adjusts a throttle opening degree, a shift stage, or the like, of the engine according to the information input from a traveling controller 160, which will be described below.

When driving force output apparatus 90 includes only a traveling motor, the motor ECU adjusts a duty ratio of a PWM signal provided to the traveling motor according to the information input from the traveling controller 160.

When the driving force output apparatus 90 includes an engine and a traveling motor, both of the engine ECU and the motor ECU cooperate with each other to control the traveling driving force according to the information input from the traveling controller 160.

The steering apparatus 92 includes, for example, a steering ECU and an electric motor. The electric motor changes a direction of a steered wheel by applying a force to, for example, a rack and pinion mechanism.

The steering ECU changes the direction of the steered wheel by driving the electric motor according to the information input from the vehicle control system 100 or the information of the input steering angle or steering torque.

The brake apparatus 94 is an electric servo brake apparatus including, for example, a brake caliper, a cylinder configured to transmit a hydraulic pressure to the brake caliper, an electric motor configured to generate a hydraulic pressure in the cylinder, and a braking controller.

The braking controller of the electric servo brake apparatus controls the electric motor according to the information input from the traveling controller 160, and a brake torque according to a braking operation is output to the wheels.

The electric servo brake apparatus may include a mechanism configured to transmit a hydraulic pressure generated by an operation of a brake pedal to a cylinder via a master cylinder as a backup.

Further, the brake apparatus 94 is not limited to the above-mentioned electric servo brake apparatus and may be an electronically controlled hydraulic brake apparatus. The electronically controlled hydraulic brake apparatus controls an actuator according to the information input from the traveling controller 160, and transmits the hydraulic pressure of the master cylinder to the cylinder.

In addition, the brake apparatus 94 may include a regeneration brake using a traveling motor that may be included in the driving force output apparatus 90. The regeneration brake uses the electric power generated by the traveling motor that may be included in the driving force output apparatus 90.

[Vehicle Control System]

Hereinafter, the vehicle control system 100 will be described. The vehicle control system 100 is realized by, for example, one or more processors or hardware having an equivalent function. The vehicle control system 100 may be a configuration in which a processor such as a central processing unit (CPU) or the like, a storage device, and an ECU, an MPU, or the like, to which a communication interface is connected by an internal bus, are combined.

The vehicle control system 100 includes, for example, the target lane determining part 110, an automated driving controller 120 and a storage 190.

The automated driving controller 120 includes, for example, a host vehicle position recognition part 122, an outside recognition part 130, an action plan generating part 140, a trajectory generating part 150, the traveling controller 160, the switching controller 170 and a direction indicator controller 180.

The trajectory generating part 150 and the traveling controller 160 are an example of "the controller."

Some or all of parts of the target lane determining part 110 and the automated driving controller 120 are realized as a processor executes a program (software). In addition, some or all of them may be realized by hardware such as a large scale integration (LSI), an application specific integrated circuit (ASIC), or the like, or may be realized by combination of software and hardware.

For example, information such as high accuracy map information 192, target lane information 194, action plan information 196, and so on, is stored in the storage 190.

The storage 190 is realized by a read only memory (ROM), a random access memory (RAM), a hard disk drive (HDD), a flash memory, or the like. The program executed by the processor may be previously stored on the storage 190, or may be downloaded from an external device via in-vehicle Internet equipment or the like.

In addition, the program may be installed on the storage 190 when a portable recording medium on which the program is stored is mounted on a drive device (not shown).

In addition, the vehicle control system 100 may be constituted by a plurality of computer devices that are decentralized.

The target lane determining part 110 is realized by, for example, the MPU. The target lane determining part 110 divides a route provided from the navigation device 50 into a plurality of blocks (for example, divided by each 100[*m*]

in a vehicle advance direction), and determines a target lane at each block with reference to the high accuracy map information 192. For example, the target lane determining part 110 performs determination that the host vehicle is traveling on which number of lane from the left. The target lane determining part 110 determines a target lane such that the host vehicle M can travel along a reasonable traveling route for advancing to a lane branched off, for example, when a branching point, a merging point, or the like, is present in the route. The target lane determined by the target lane determining part 110 is stored in the storage 190 as the target lane information 194.

The high accuracy map information 192 is map information that is more accurate than that of a navigation map provided in the navigation device 50. The high accuracy map information 192 includes, for example, information on centers of lanes, information on boundaries of lanes, or the like.

In addition, the high accuracy map information 192 may include road information, traffic regulations information, address information (address/zip code), facility information, telephone number information, and so on. The road information includes information that represents a kind of road such as an expressway, a toll road, a national road or a prefectural road, and information such as the number of lanes of a road, a width of each lane, an inclination of a road, a position of a road (three-dimensional coordinates including a longitude, a latitude and a height), a curvature of a curve of a lane, positions of merging and branching points of lanes, marks provided on a road, and so on.

The traffic regulations information includes information on lanes being blocked due to roadwork, traffic accidents, traffic congestion, or the like.

The host vehicle position recognition part 122 of the automated driving controller 120 recognizes a lane on which the host vehicle M is traveling (a traveling lane) and a relative position of the host vehicle M with respect to the traveling lane on the basis of the high accuracy map information 192 stored in the storage 190 and the information input from the finders 20, the radars 30, the camera 40, the navigation device 50 or the vehicle sensor 60.

Figure 3:
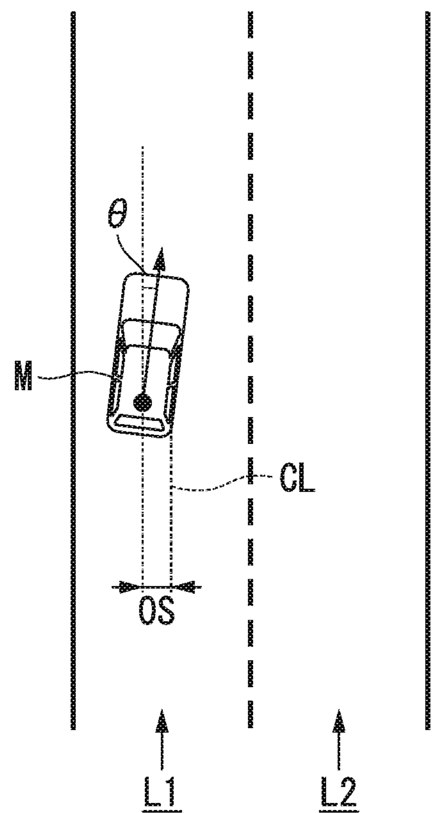
FIG. 3 is a figure showing an example of a configuration of a host vehicle position recognition part.

FIG. 3 is a figure showing an aspect in which a relative position of the host vehicle M with respect to a traveling lane L1 is recognized by the host vehicle position recognition part 122. The host vehicle position recognition part 122 recognizes, for example, a deviation OS from a traveling lane center CL of a reference point (for example, a center of gravity, a center of a rear wheel shaft, or the like) of the host vehicle M, and an angle θ formed by a direction of advance of the host vehicle M with respect to the traveling lane center CL as a relative position of the host vehicle M with respect to the traveling lane L1.

Further, instead of this, the host vehicle position recognition part 122 may recognize a position of a reference point of the host vehicle M with respect to any one of side end portions of an own traffic lane L1 as a relative position of the host vehicle M with respect to the traveling lane. The relative position of the host vehicle M recognized by the host vehicle position recognition part 122 is provided to the target lane determining part 110.

The outside recognition part 130 recognizes a state such as a position, a speed, an acceleration, or the like, of a neighboring vehicle on the basis of the information input from the finders 20, the radars 30, the camera 40, and so on.

The neighboring vehicle is, for example, a vehicle that is traveling around the host vehicle M, and a vehicle that is traveling in the same direction as the host vehicle M. A position of the neighboring vehicle may be represented as a representative point including a center of gravity, a corner, or the like, of another vehicle, or may be represented as a region expressed as a profile of another vehicle.

"The state" of the neighboring vehicle may include whether acceleration or lane change of the neighboring vehicle is being performed (or whether the lane change is to be performed) that is ascertained on the basis of information from the above mentioned various instruments.

In addition, the outside recognition part 130 recognizes a position of a driver on the recognized neighboring vehicle. For example, the outside recognition part 130 estimates a position of a window frame from a shape of a vehicle body of the neighboring vehicle, predicts a seat position of a driver from a disposition pattern of the window frame, and recognizes the predicted position as a position of a driver.

In addition, the outside recognition part 130 may recognize a position of a driver by estimating a seat position in the vehicle on the basis of positions of door mirrors, positions of wheels (tires), or the like, of the neighboring vehicle.

In addition, the outside recognition part 130 may recognize a position of a driver (a human) from the captured image of the camera 40 by performing image processing such as feature point matching or the like with respect to the captured image, or may recognize a position of a driver by performing analysis processing of a spectrum, which represents light or features of radio waves reflected by the human, with respect to the detection results of the finders 20 or the radars 30.

In addition, the outside recognition part 130 may recognize positions of a guard rail, an electricity pole, a parked vehicle, a pedestrian, or other bodies, in addition to a neighboring vehicle. In particular, the outside recognition part 130 recognizes an obstacle such as a fallen object on a driveway, a stopped neighboring vehicle, an object (for example, a pylon or a signboard) in the vicinity of a roadwork, a pedestrian, or the like, on the target lane determined by the target lane determining part 110.

The action plan generating part 140 sets a start point of automated driving and/or a destination of automated driving. The start point of automated driving may be a current position of the host vehicle M or may be a point at which an operation of instructing automated driving is performed. The action plan generating part 140 generates an action plan in a section between the start point and the destination of automated driving. Further, there is no limitation thereto, and the action plan generating part 140 may generate an action plan in an arbitrary section.

The action plan is constituted by, for example, a plurality of events, which are performed in sequence.

The event includes, for example, a deceleration event of decelerating the host vehicle M, an acceleration event of accelerating the host vehicle M, a lane keeping event of causing the host vehicle M to travel and not to deviate from a target lane, a lane change event of changing target lanes, an overtaking event of causing the host vehicle M to overtake a preceding vehicle, a branching event of changing to a predetermined lane at an branching point or causing the host vehicle M to travel such that it does not deviate from the current target lane, a merging event of accelerating and decelerating the host vehicle M at a merging lane to join the main line and changing target lanes, and so on.

The action plan generating part 140 sets a lane change event, a branching event, or a merging event at a place in which the target lane determined by the target lane determining part 110 is switched.

The information that represents the action plan generated by the action plan generating part 140 is stored in the storage 190 as the action plan information 196.

Figure 4:
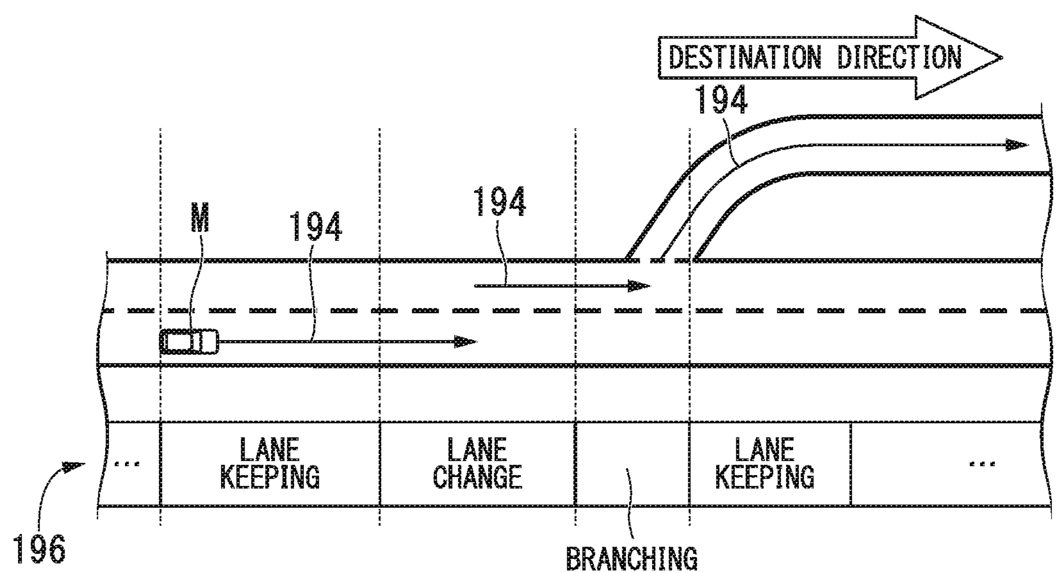
FIG. 4 is a figure showing an example of an action plan generated in a certain section.

FIG. 4 is a figure showing an example of an action plan generated in a certain section. As shown in FIG. 4, the action plan generating part 140 generates an action plan required for the host vehicle M to travel on the target lane represented by the target lane information 194. Further, the action plan generating part 140 may dynamically change the action plan according to variation in circumstances of the host vehicle M regardless of the target lane information 194.

For example, the action plan generating part 140 may change an event set to a driving section to which the host vehicle M will travel when a speed of a neighboring vehicle recognized by the outside recognition part 130 while the vehicle is traveling exceeds a threshold value or when a moving direction of a neighboring vehicle that is traveling on a lane adjacent to the own traffic lane is oriented toward a direction of the own traffic lane.

For example, in the case in which an event is set such that a lane change event is performed after a lane keeping event, when it is determined that a vehicle is advancing at a speed of a threshold value or more from the rear in the lane to which the lane change is possible during the lane keeping event according to the recognition results of the outside recognition part 130, the action plan generating part 140 may change the event after the lane keeping event from a lane change event to a deceleration event, a lane keeping event, or the like. As a result, the vehicle control system 100 enables safe automated traveling of the host vehicle M even when a variation occurs in an outside state.

Figure 5:
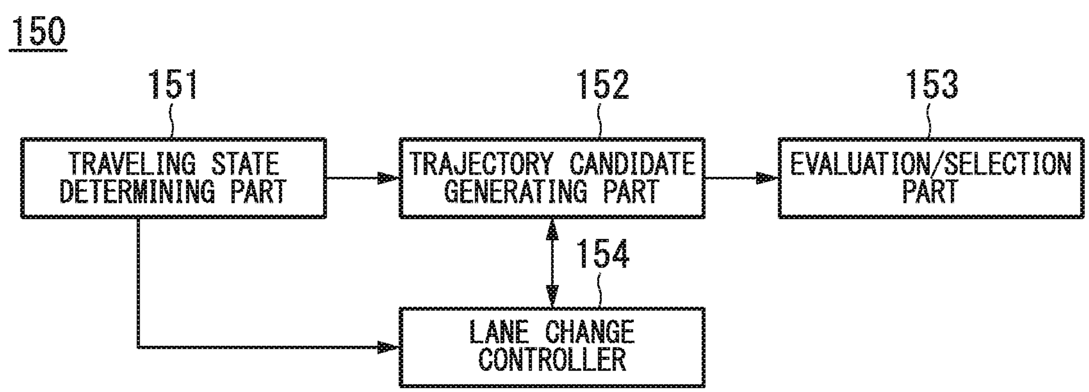
FIG. 5 is a figure showing an example of a configuration of a trajectory generating part.

FIG. 5 is a figure showing an example of a configuration of the trajectory generating part 150. The trajectory generating part 150 includes, for example, a traveling state determining unit 151, a trajectory candidate generating part 152, an evaluation/selection part 153 and a lane change controller 154.

The traveling state determining unit 151 determines a traveling aspect of any one of constant speed traveling, following traveling, deceleration traveling, curve traveling, obstacle avoidance traveling, and so on, when a lane keeping event is executed.

For example, the traveling state determining unit 151 may determine the traveling aspect as constant speed traveling when another vehicle is not present in front of the host vehicle M.

In addition, the traveling state determining unit 151 may determine the traveling aspect as following traveling when the host vehicle follows a preceding vehicle.

In addition, the traveling state determining unit 151 may determine the traveling aspect as deceleration traveling when deceleration of the preceding vehicle is recognized by the outside recognition part 130 or when an event such as stopping, parking, or the like, is executed.

In addition, the traveling state determining unit 151 may determine the traveling aspect as curve traveling when it is recognized by the outside recognition part 130 that the host vehicle M is approaching a curve road.

In addition, the traveling state determining unit 151 may determine the traveling aspect as obstacle avoidance traveling when an obstacle in front of the host vehicle M is recognized by the outside recognition part 130.

The trajectory candidate generating part 152 generates trajectory candidates on the basis of the traveling aspect determined by the traveling state determining unit 151. The trajectory of the embodiment is a collection of target positions (trajectory points) at which a reference point (for example, a center of gravity or a center of the rear wheel shaft) of the host vehicle M is assumed to reach at predetermined time intervals (or each of predetermined traveling distances) in the future.

The trajectory candidate generating part 152 calculates a target speed of the host vehicle M on the basis of at least a speed of an object OB present in front of the host vehicle M recognized by the outside recognition part 130 and a distance between the host vehicle M and the object OB.

The trajectory candidate generating part 152 generates one or more trajectories on the basis of the calculated target speed. The object OB includes a preceding vehicle, a point such as a merging point, a branching point, a target point, or the like, a body such as an obstacle or the like, and so on.

Figure 6:
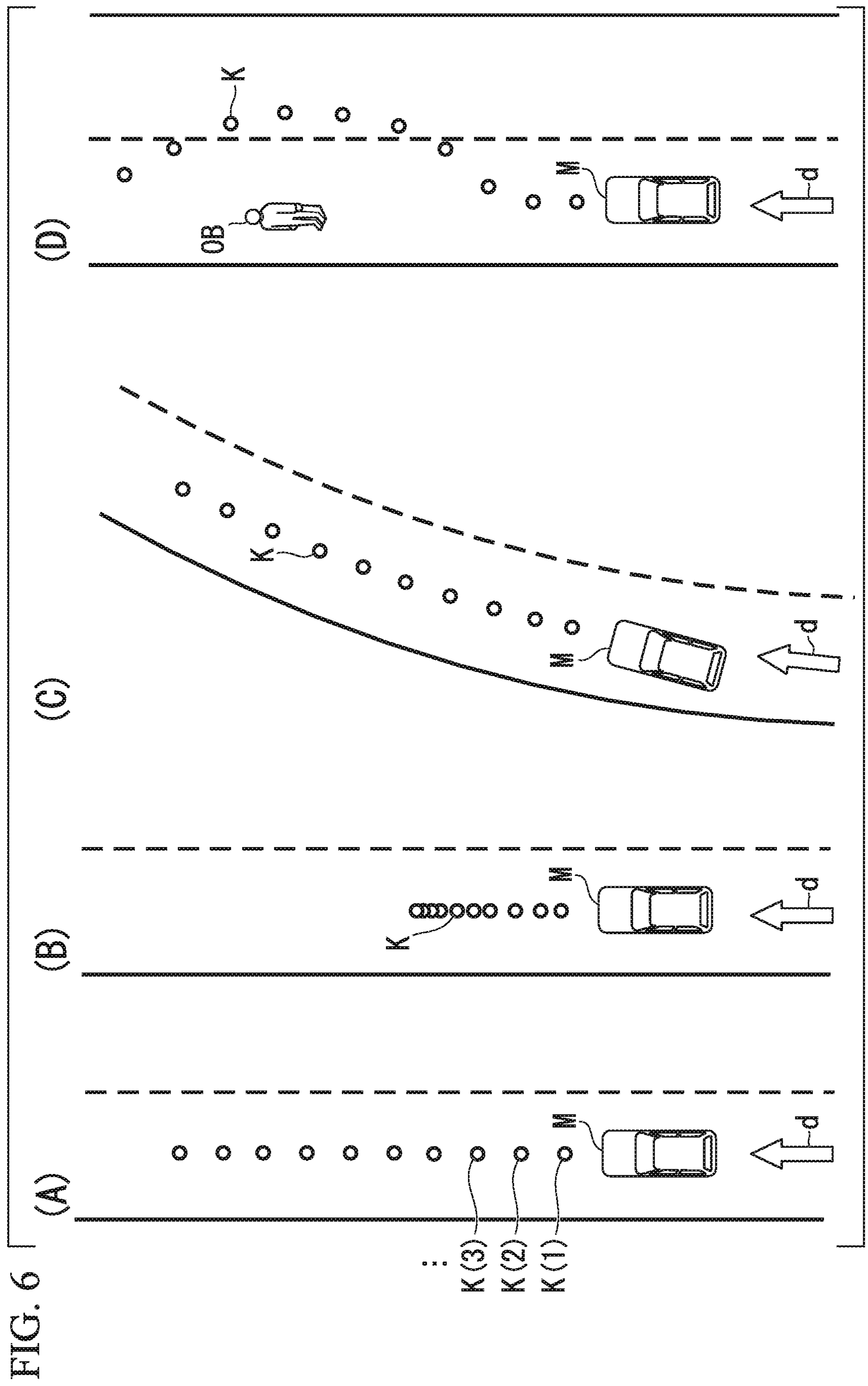
FIG. 6 is a figure showing an example of trajectory candidates generated by a trajectory candidate generating part.

FIG. 6 is a figure showing an example of trajectory candidates generated by the trajectory candidate generating part 152.

Further, in FIG. 6 and FIG. 9 that is to be described below, only a representative trajectory among a plurality of trajectory candidates that are set, or a trajectory selected by the evaluation/selection part 153 are noted and described. As shown in part (A) of FIG. 6, for example, the trajectory candidate generating part 152 sets trajectory points that are referred to as K(1), K(2), K(3), . . . whenever a predetermined time Δt elapses from the current time with reference to the current position of the host vehicle M. Hereinafter, when the trajectory points are not distinguished, they are simply expressed as "a trajectory point K."

When the traveling aspect is determined as constant speed traveling by the traveling state determining unit 151, as shown in part (A) of FIG. 6, the trajectory candidate generating part 152 sets the plurality of trajectory points K at equal intervals. When such a simple trajectory is generated, the trajectory candidate generating part 152 may generate only one trajectory.

When the traveling aspect is determined as deceleration traveling by the traveling state determining unit 151 (including when a preceding vehicle decelerates in following traveling), as shown in part (B) of FIG. 6, the trajectory candidate generating part 152 generates a trajectory by widening the interval between the trajectory points K having an earlier arrival time and narrowing the interval between the trajectory points K having a later arrival time. In this case, the preceding vehicle may be set as the object OB, or in addition to the preceding vehicle, a point such as a merging point, a branching point, a target point, or the like, an obstacle, or the like, may be set as the object OB. Accordingly, since the current position of the host vehicle M approaches the trajectory point K having a later arrival time from the host vehicle M, the traveling controller 160, which will be described below, causes the host vehicle M to decelerate.

When the traveling aspect is determined as curve traveling by the traveling state determining unit 151, as shown in part (C) of FIG. 6, the trajectory candidate generating part 152 disposes the plurality of trajectory points K according to a curvature of the road while changing a lateral position in the direction of advance of the host vehicle M (a position in a lane width direction).

In addition, as shown in part (D) of FIG. 6, when the obstacle OB such as a person, a stopped vehicle, or the like, is present on a road in front of the host vehicle M, the trajectory candidate generating part 152 disposes the plurality of trajectory points K such that the host vehicle travels while avoiding the obstacle OB.

The evaluation/selection part 153 performs, for example, evaluation from two viewpoints of planning and safety and selects the trajectory output to the traveling controller 160 with respect to the trajectory candidates generated by the trajectory candidate generating part 152. From a viewpoint of planning, for example, a trajectory is highly evaluated when trackability with respect to an already generated plan (for example, an action plan) is higher, and when the entire length of the trajectory is shorter. For example, when changing lanes to the right is desired, the trajectory which changes the lane to the left once and returns is evaluated low. From a viewpoint of safety, for example, it is evaluated higher as a distance between the host vehicle M and a body (a neighboring vehicle or the like) is larger and variation or the like in acceleration and deceleration or steering angle is smaller.

The lane change controller 154 is operated when the lane change event, the branching event, the merging event, or the like, is executed, i.e., when lane change in a broad sense is operated.

Figure 7:
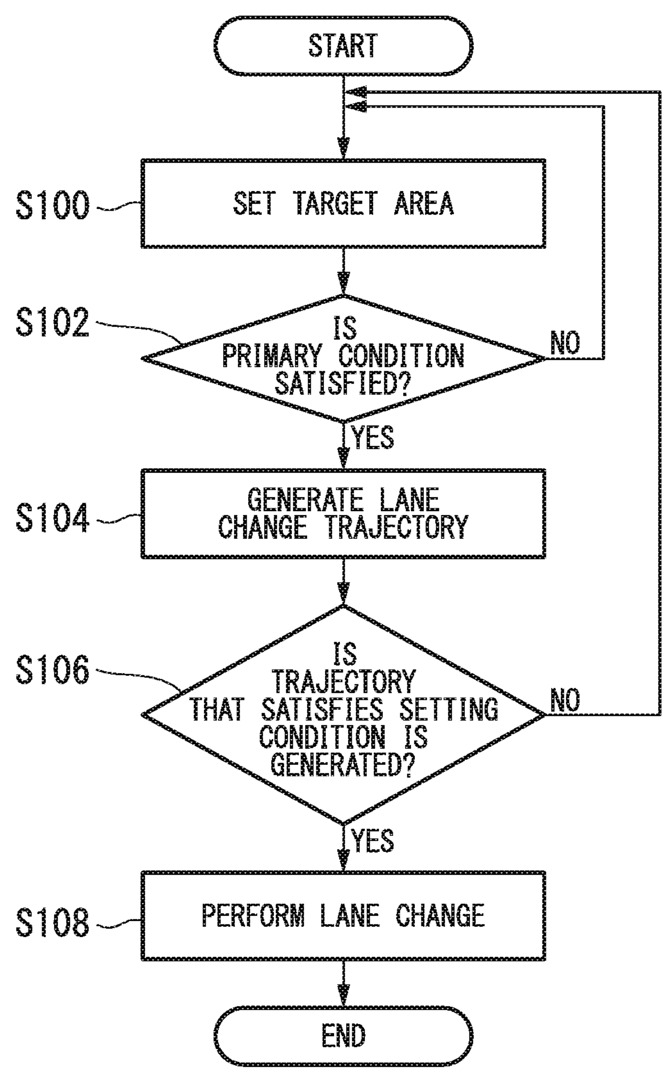
FIG. 7 is a flowchart showing an example of a flow of processing performed when a lane change event is performed.

FIG. 7 is a flowchart showing an example of a flow of processing performed when the lane change event is executed. The processing will be described with reference to FIGS. 7 and 8.

First, the lane change controller 154 selects two neighboring vehicles from the neighboring vehicles which are traveling on the adjacent lane that is the lane adjacent to a lane (an own traffic lane) on which the host vehicle M is traveling and that is the lane to which the lane change is performed, and sets a target area TA between the neighboring vehicles (step S100).

Hereinafter, the neighboring vehicle that is traveling in front of the target area TA on the adjacent lane is referred to as a preceding reference vehicle mB, and the neighboring vehicle that is traveling immediately at rear of the target area TA on the adjacent lane is referred to as a following reference vehicle mC and then described. The target area TA is a relative position on the basis of a positional relationship between the host vehicle M, the preceding reference vehicle mB and the following reference vehicle mC.

Figure 8:
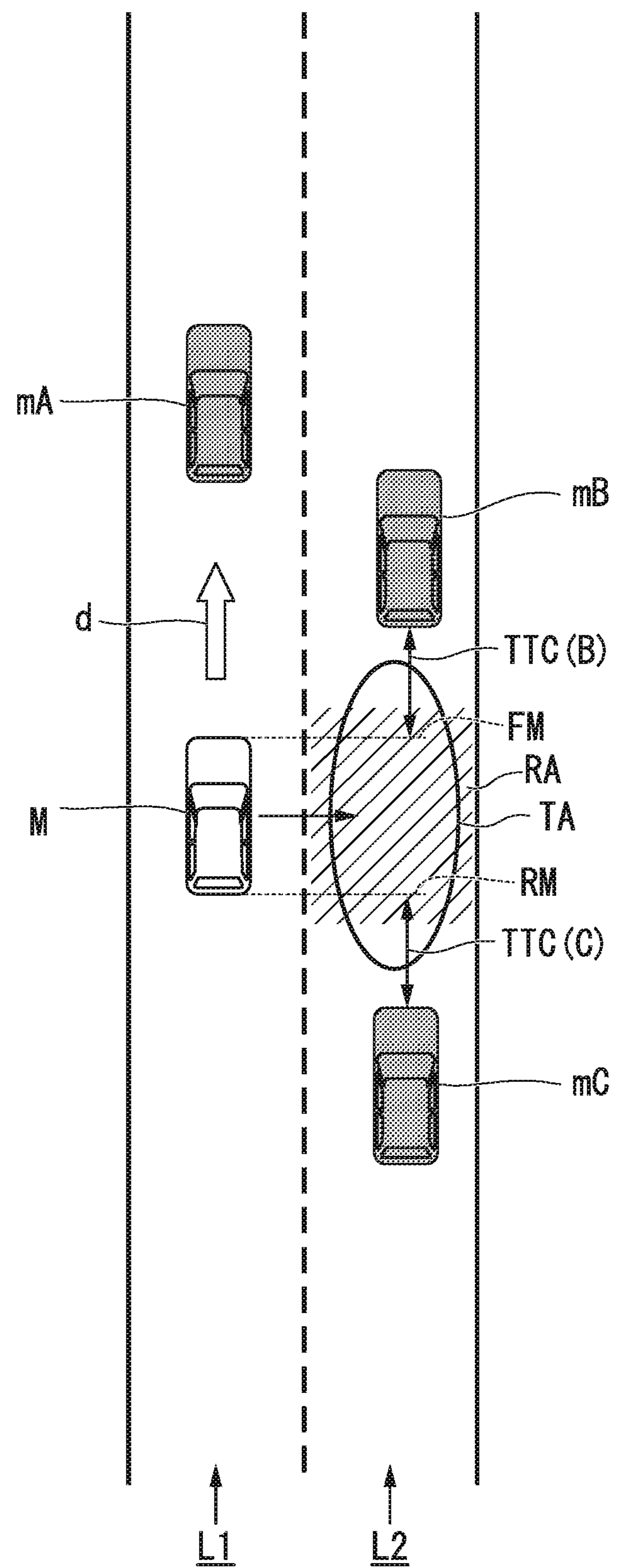
FIG. 8 is a figure showing an aspect in which a target area is set.

FIG. 8 is a figure showing an aspect in which the target area TA is set. In FIG. 8, mA represents a preceding vehicle, mB represents a preceding reference vehicle, and mC represents a following reference vehicle. In addition, an arrow d represents a direction of advance (traveling) of the host vehicle M, L1 represents an own traffic lane, and L2 represents an adjacent lane.

In the case of FIG. 8, the lane change controller 154 sets the target area TA between the preceding reference vehicle mB and the following reference vehicle mC on the adjacent lane L2.

Next, the lane change controller 154 determines whether a primary condition for determining whether lane change to the target area TA (i.e., between the preceding reference vehicle mB and the following reference vehicle mC) is possible is satisfied (step S102).

For example, the primary condition is that none of a part of the neighboring vehicle is present in a forbidden region RA formed on the adjacent lane and each of TTCs (Time-to-Collision) between the host vehicle M, the preceding reference vehicle mB and the following reference vehicle mC is larger than the threshold value.

Further, the determination condition is an example of the case in which the target area TA is set to a side of the host vehicle M.

When the primary condition is not satisfied, the lane change controller 154 returns the processing to step S100 and resets the target area TA.

Here, speed control for moving the host vehicle to a side of the target area TA may be performed by waiting until a timing when the primary condition is satisfied and the target area TA can be set or by changing the target area TA.

As shown in FIG. 8, for example, the lane change controller 154 projects the host vehicle M to the lane L2 to which the lane change is to be performed, and sets the forbidden region RA which includes a slight marginal distance maintained in a forward/rearward direction. The forbidden region RA is set as a region extending from one end to the other end in a lateral direction of the lane L2.

When a neighboring vehicle is not present in the forbidden region RA, for example, the lane change controller 154 assumes an extension line FM and an extension line RM virtually extending from a front end and a rear end of the host vehicle M, respectively, toward the lane L2 to which the lane change is to be performed.

The lane change controller 154 calculates a time to collision TTC(B) between the extension line FM and the preceding reference vehicle mB, and a following reference vehicle TTC(C) between the extension line RM and the following reference vehicle mC.

The time to collision TTC(B) is a time derived by dividing a distance between the extension line FM and the preceding reference vehicle mB by a relative speed between the host vehicle M and the preceding reference vehicle mB.

The time to collision TTC(C) is a time derived by dividing a distance between the extension line RM and the following reference vehicle mC by a relative speed between the host vehicle M and the following reference vehicle mC.

The trajectory candidate generating part 152 determines that the primary condition is satisfied when the time to collision TTC(B) is larger than a threshold value Th(B) and the time to collision TTC(C) is larger than a threshold value Th(C).

The threshold values Th(B) and Th(C) may be the same value or may be different values.

When the primary condition is satisfied, the lane change controller 154 generates trajectory candidates for lane change using the trajectory candidate generating part 152 (step S104).

Figure 9:
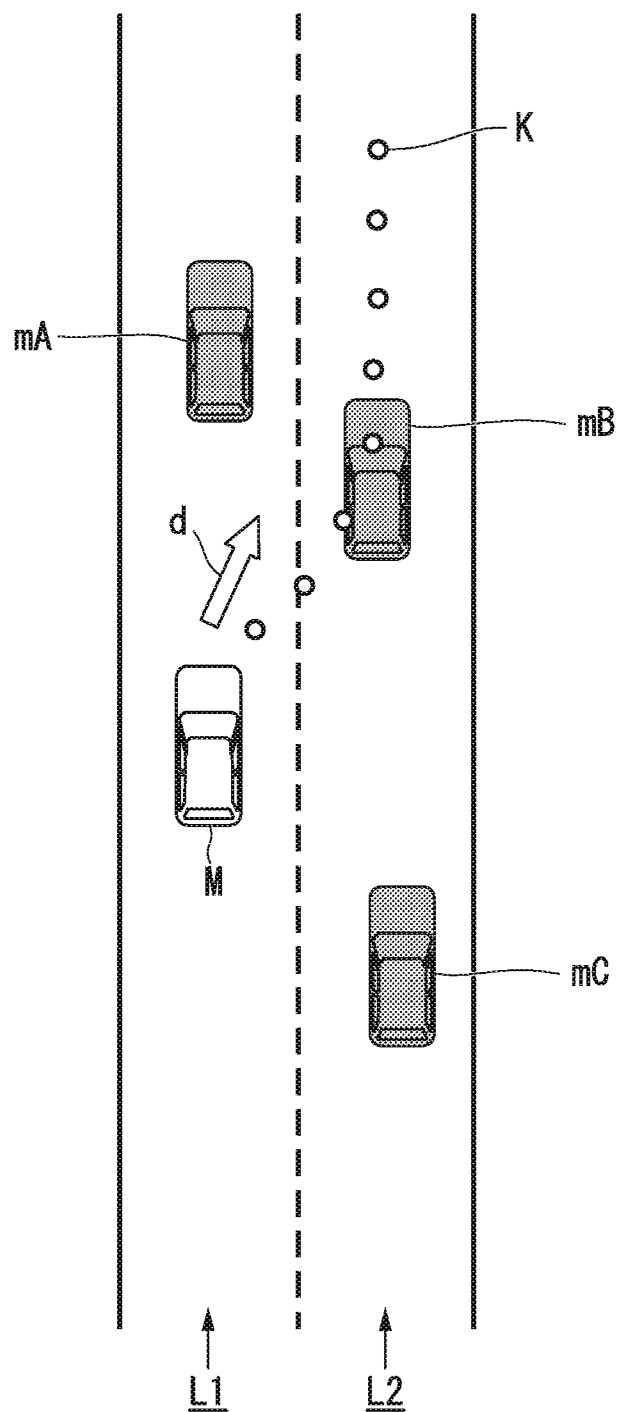
FIG. 9 is a figure showing an aspect in which a trajectory for lane change is generated.

FIG. 9 is a figure showing an aspect in which a trajectory for lane change is generated. For example, the trajectory candidate generating part 152 assumes that the preceding vehicle mA, the preceding reference vehicle mB and the following reference vehicle mC are traveling in a predetermined speed model, and generates trajectory candidates so that the host vehicle M is disposed between the preceding reference vehicle mB and the following reference vehicle mC at a time in the future on the basis of the speed model of the three vehicles and the speed of the host vehicle M so that the host vehicle M and the preceding vehicle mA do not interfere or contact with each other.

For example, the trajectory candidate generating part 152 smoothly connects the current position of the host vehicle M with a position of the preceding reference vehicle mB in a certain time in the future, a center of a lane to which lane change is to be performed and an end point for the lane change using a polynomial curve line of a spline curve line or the like, and disposes a predetermined number of trajectory points K at equal intervals or non-equal intervals on the curve line.

Here, the trajectory candidate generating part 152 generates a trajectory such that at least one of the trajectory points K is disposed in the target area TA.

When the primary condition is not satisfied, the lane change controller 154 may return to the above-mentioned processing of S100 and set a new target area TA.

Figure 10:
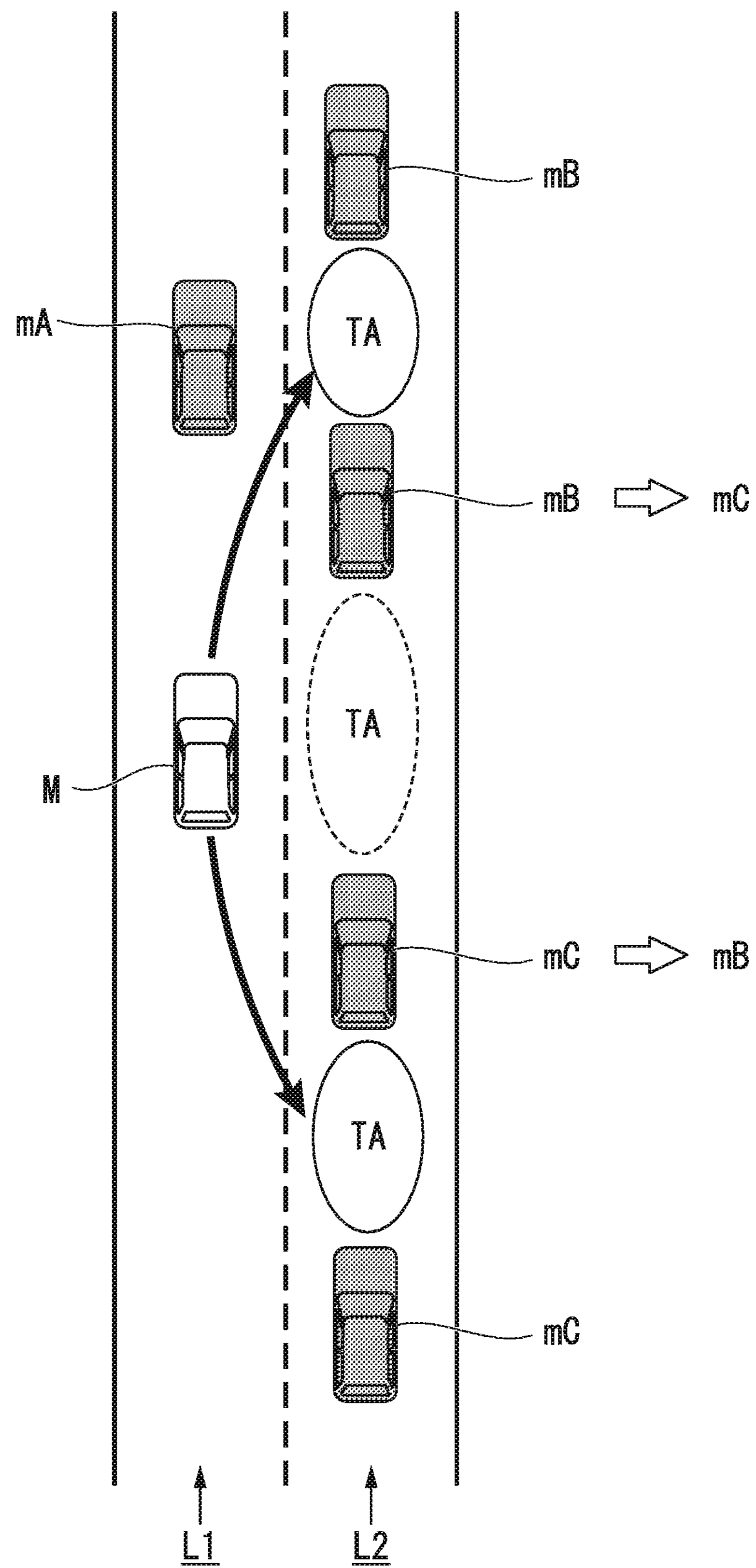
FIG. 10 is a figure showing an example of a scene in which a target area is reset.

FIG. 10 is a figure showing an example of a scene in which the target area TA is reset. When the primary condition is not satisfied with respect to the target area TA set in the scene shown in FIG. 8, for example, the lane change controller 154 sets the following reference vehicle mC, which was referred when the target area TA was set, as a new preceding reference vehicle mB, sets a vehicle present at rear of the newly set preceding reference vehicle mB as a new following reference vehicle mC, and resets the target area TA between the preceding reference vehicle mB and the following reference vehicle mC, which have been reset.

Further, similarly, the lane change controller 154 may set the preceding reference vehicle mB, which was referred when the target area TA was set, as a new following reference vehicle mC, set a vehicle present in front of the newly set following reference vehicle mC as a new preceding reference vehicle mB, and reset the target area TA between the preceding reference vehicle mB and the following reference vehicle mC, which have been reset.

Accordingly, the trajectory candidate generating part 152 generates a trajectory for performing a lane change of the host vehicle M between the preceding reference vehicle mB and the following reference vehicle mC, which have been reset.

Next, the evaluation/selection part 153 determines whether trajectory candidates that satisfy a setting condition have been generated (step S106).

The setting condition means that, for example, an evaluation value of a threshold value or more is obtained from the viewpoint of the above-mentioned planning or safety. When trajectory candidates that satisfy the setting condition are generated, for example, the evaluation/selection part 153 performs the lane change by selecting a trajectory candidate having the highest evaluation value and outputting the trajectory information to the traveling controller 160 (step S108).

Meanwhile, when a trajectory that satisfies the setting condition is not generated, the processing is returned to step S100. Here, like the case in which negative determination is obtained in step S102, the processing of becoming a standby state or resetting the target area TA may be performed.

The traveling controller 160 controls the driving force output apparatus 90, the steering apparatus 92 and the brake apparatus 94 such that the host vehicle M passes along the trajectory generated by the trajectory candidate generating part 152 in the scheduled time.

The switching controller 170 switches a driving mode on the basis of an operation of instructing acceleration, deceleration or steering with respect to the operation device 70, in addition to switching a driving mode on the basis of the driving mode designating signal input from the selector switch 80.

For example, the switching controller 170 may switch the driving mode from an automated driving mode to a manual driving mode when a state in which the operation amount input from the operation detecting sensor 72 exceeds the threshold value is maintained for a reference time or more.

In addition, the switching controller 170 may switch the driving mode from the automated driving mode to the manual driving mode in the vicinity of the destination of the automated driving.

The switching controller 170 switches the control mode on the basis of the driving mode designating signal input from the selector switch 80 when the control mode is switched from the manual driving mode to the automated driving mode.

In addition, after the control mode is switched from the automated driving mode to the manual driving mode, the control of returning to the automated driving mode may be performed when an operation of instructing acceleration, deceleration or steering with respect to the operation device 70 is not detected for a predetermined time.

Figure 11:
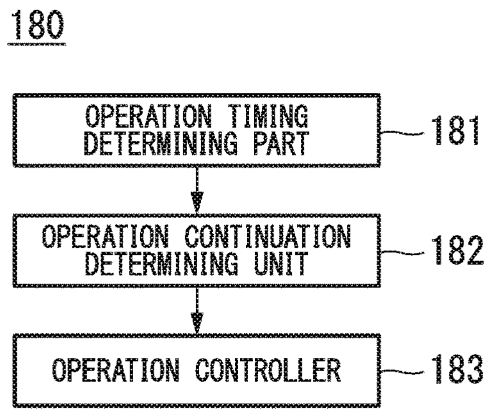
FIG. 11 is a figure showing an example of a configuration of a direction indicator controller.

FIG. 11 is a figure showing an example of a configuration of the direction indicator controller 180. The direction indicator controller 180 includes, for example, an operation timing determining part 181, an operation continuation determination part 182 and an operation controller 183.

The operation timing determining part 181 sets a reference position referenced when positions of the vehicles are compared with respect to the host vehicle M and any one or both of the preceding reference vehicle mB and the following reference vehicle mC when the target area TA is set by the lane change controller 154.

Hereinafter, a reference position set to the host vehicle M is designated by reference character $CP_M$, a reference position set to the preceding reference vehicle mB is designated by reference character $CP_{mB}$, and a reference position set to the following reference vehicle mC is designated by reference character $CP_{mC}$ and described.

The operation timing determining part 181 determines a timing when the direction indicators TL are operated by comparing the reference position $CP_M$ of the host vehicle M with any one or both of the reference position $CP_{mB}$ of the preceding reference vehicle mB and the reference position $CP_{mC}$ of the following reference vehicle mC.

The reference position $CP_M$ of the host vehicle M may be a position at which the direction indicators TL are installed, or may be any one of installation positions of the direction indicators TL1 and TL2 on the side of the front end portion of the vehicle, installation positions of the direction indicators TL3 and TL4 of the side portions of the vehicle and installation positions of the direction indicators TL5 and TL6 on the side of the rear end portion of the vehicle, or a center of these positions.

Each of the reference position $CP_{mB}$ of the preceding reference vehicle mB and the reference position $CP_{mC}$ of the following reference vehicle mC is, for example, a position of a driver in the vehicle.

For example, in the case in which the target area TA set on the adjacent lane is present at rear of the host vehicle, the operation timing determining part 181 determines to operate the direction indicators TL on the side of the adjacent lane on which the target area TA is set at a timing in which the reference position $CP_{mB}$ of the preceding reference vehicle mB coincides with the reference position $CP_M$ of the host vehicle M, or a timing in which the reference position $CP_M$ of the host vehicle M is disposed at rear of the reference position $CP_{mB}$ of the preceding reference vehicle mB in the direction of advance of the host vehicle (a timing after the coinciding timing).

"The target area TA is disposed at rear of the host vehicle" is referred as, for example, that the reference position $CP_M$ of the host vehicle M is present in front of the reference position $CP_{mB}$ of the preceding reference vehicle mB referenced upon setting of the target area TA in the direction of advance of the host vehicle.

In addition, in the case in which the target area TA set on the adjacent lane is present in front of the host vehicle, the operation timing determining part 181 determines to operate the direction indicators TL on the side of the adjacent lane on which the target area TA is set at a timing in which the reference position $CP_{mC}$ of the following reference vehicle mC coincides with the reference position $CP_M$ of the host vehicle M or a timing in which the reference position $CP_M$ of the host vehicle M is present in front of the reference position $CP_{mC}$ of the following reference vehicle mC in the direction of advance of the host vehicle (a timing after the coinciding timing).

"The target area TA is present in front of the host vehicle" is referred to as, for example, that the reference position $CP_M$ of the host vehicle M is present at rear of the reference position $CP_{mC}$ of the following reference vehicle mC referenced upon setting of the target area TA in the direction of advance of the host vehicle.

In addition, the operation timing determining part 181 may determine to operate the direction indicators TL on the side of the adjacent lane on which the target area TA is set at a timing in which the reference position $CP_M$ of the host vehicle M is present in front of the reference position $CP_{mC}$ of the following reference vehicle mC and present at rear of the reference position $CP_{mB}$ of the preceding reference vehicle mB.

The operation continuation determination part 182 changes an action plan (an event) using the action plan generating part 140, determines whether the lane change by the lane change controller 154 is possible, and determines whether the lighting (flickering) is maintained or turned off after the direction indicators TL are operated on the basis of switching or the like of the control mode using the switching controller 170.

For example, the operation continuation determination part 182 determines to turn off the direction indicators TL when the lane change event is changed to another event by the action plan generating part 140 before the direction indicators TL are operated and the host vehicle M arrives at the target area TA.

In addition, the operation continuation determination part 182 determines to turn off the direction indicators TL when the switching controller 170 is switched to the manual driving mode according to an operation by a driver during the automated driving mode.

In addition, the operation continuation determination part 182 determines to continue the operations of the direction indicators TL when it is determined whether lane change to another target area TA is continuously possible in the case in which the following reference vehicle mC approaches the preceding reference vehicle mB and an inter-vehicle distance required for the lane change is not sufficiently secured after it is determined once by the lane change controller 154 that the lane change with respect to the target area TA is possible.

The operation controller 183 operates the direction indicators TL (lighting or flickering all the time) on the side of the adjacent lane on which the target area TA is set at the timing determined by the operation timing determining part 181.

In addition, the operation controller 183 continuously operates or turns off the direction indicators TL according to the determination results by the operation continuation determination part 182.

Figure 12:
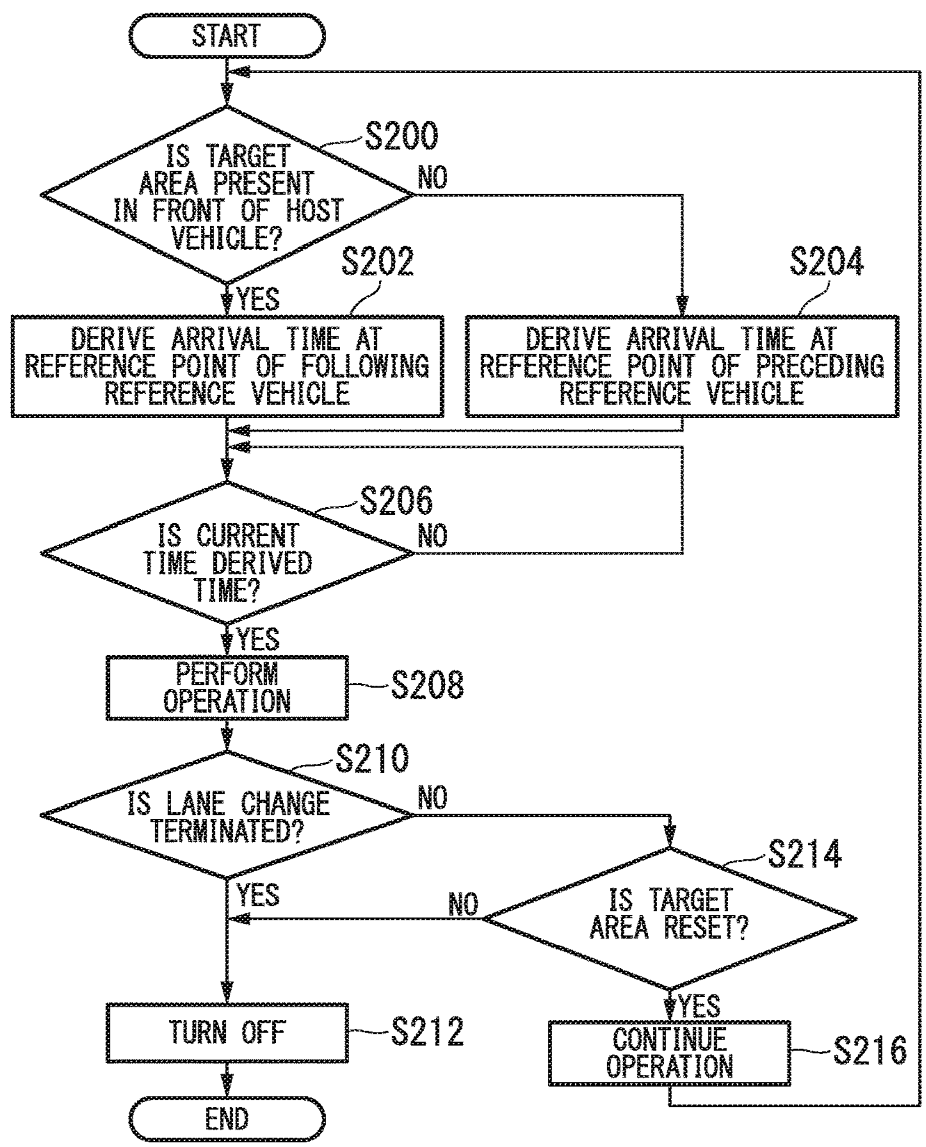
FIG. 12 is a flowchart showing an example of a flow of processing by the direction indicator controller.

Hereinafter, a series of processing using the direction indicator controller 180 will be described. FIG. 12 is a flowchart showing an example of a flow of processing using the direction indicator controller 180.

First, the operation timing determining part 181 determines whether the target area TA set by the lane change controller 154 is present in front of the host vehicle (step S200).

When the target area TA is present in front of the host vehicle, the operation timing determining part 181 derives a time when the reference position $CP_M$ of the host vehicle M arrives at the reference position $CP_{mC}$ of the following reference vehicle mC (step S202).

For example, the operation timing determining part 181 derives an operation time of the direction indicators TL by driving a time required while the host vehicle M runs a relative distance from the reference position $CP_M$ to the reference position $CP_{mC}$ when the current speed of the host vehicle M and the speed of the following reference vehicle mC are constant.

Meanwhile, when the target area TA is present at rear of the host vehicle instead of being in front of the host vehicle, the operation timing determining part 181 derives a time when the reference position $CP_{mB}$ of the preceding reference vehicle mB arrives at the reference position $CP_M$ of the host vehicle M (step S204).

For example, the operation timing determining part 181 derives an operation time of the direction indicators TL by calculating a time required while the preceding reference vehicle mB runs a relative distance from the reference position $CP_{mB}$ to the reference position $CP_M$ when the current speed of the host vehicle M and the speed of the preceding reference vehicle mB are constant.

Next, the operation controller 183 waits until the current time becomes an operation time derived by the operation timing determining part 181 (step S206), and operates the direction indicators TL at a timing when the current time becomes an operation time or at a timing when a certain level of marginal time elapses from the operation time (step S208).

Figure 13:
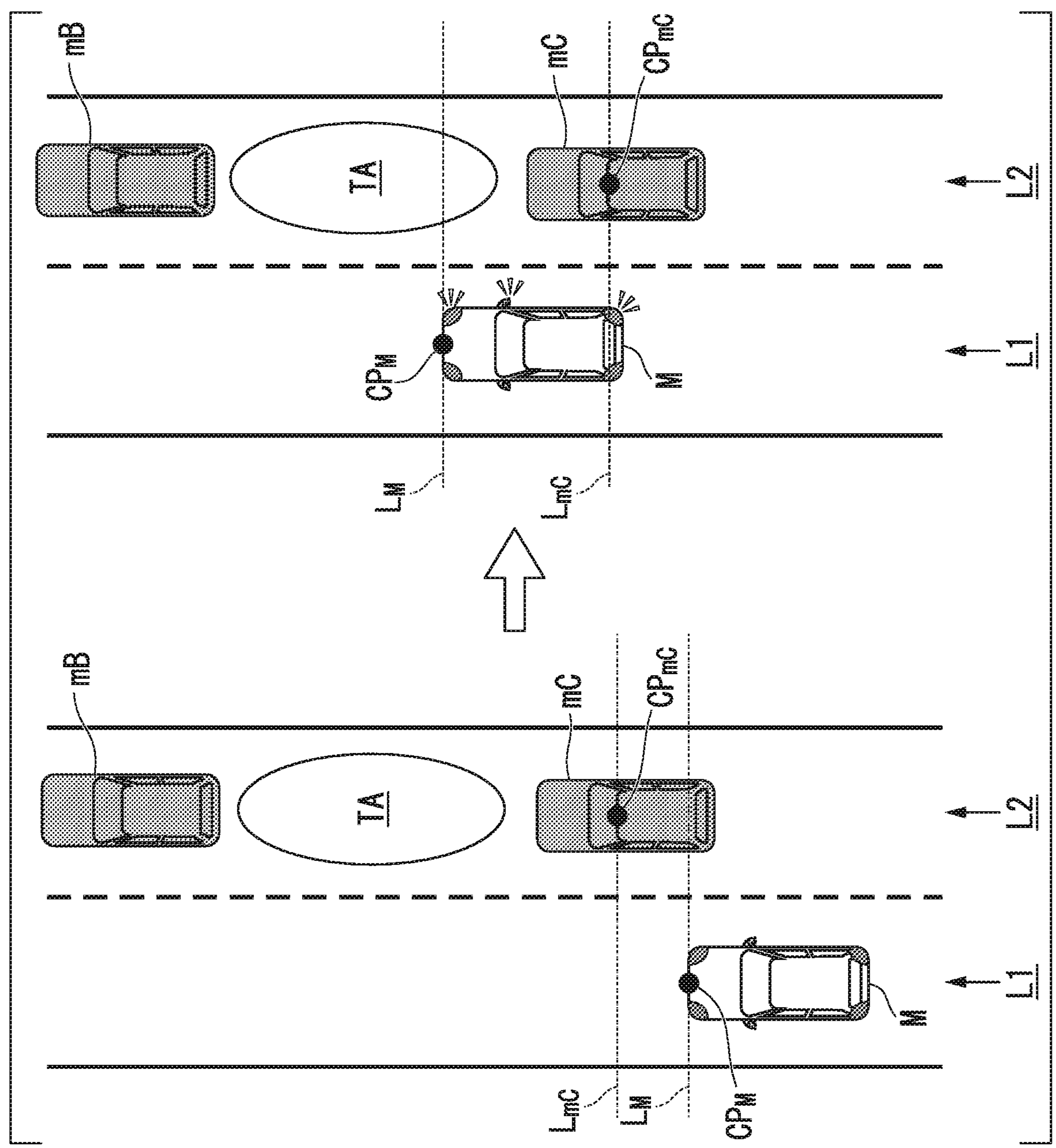
FIG. 13 is a figure showing an example of a scene in which a target area is set in front of the host vehicle.

FIG. 13 is a figure showing an example of a scene in which the target area TA is set in front of the host vehicle M. In the scene shown in FIG. 13, the direction indicators TL are operated at a timing when the reference position $CP_M$ of the host vehicle M coincides with the reference position $CP_{mC}$ of the following reference vehicle mC or a timing when the reference position $CP_{mC}$ of the following reference vehicle mC is present at rear of the reference position $CP_M$ of the host vehicle M. In this case, the reference position $CP_M$ of the host vehicle M may be the direction indicator TL2 on the right front side, may be the direction indicator TL4 on the right center side, and may be the direction indicator TL6 on the right rear side.

As shown in FIG. 13, for example, the operation timing determining part 181 assumes a reference line $L_{mC}$ virtually extending from the reference position $CP_{mC}$ of the following reference vehicle mC in a lane width direction and a reference line $L_M$ virtually extending from the reference position $CP_M$ of the host vehicle M in the lane width direction, and determines an operation timing from a positional relation of the reference lines.

The direction indicator controller 180 can give, for example, an intention, that the host vehicle M intends to interrupt in front of the following reference vehicle mC, to a driver in the following reference vehicle mC and can kindly care the driver of the following reference vehicle mC by operating the direction indicators TL at a timing when a reference line $L_M$ coincides with the reference line $L_{mC}$ or a timing when the reference line $L_M$ is present at rear of the reference line $L_{mC}$.

Figure 14:
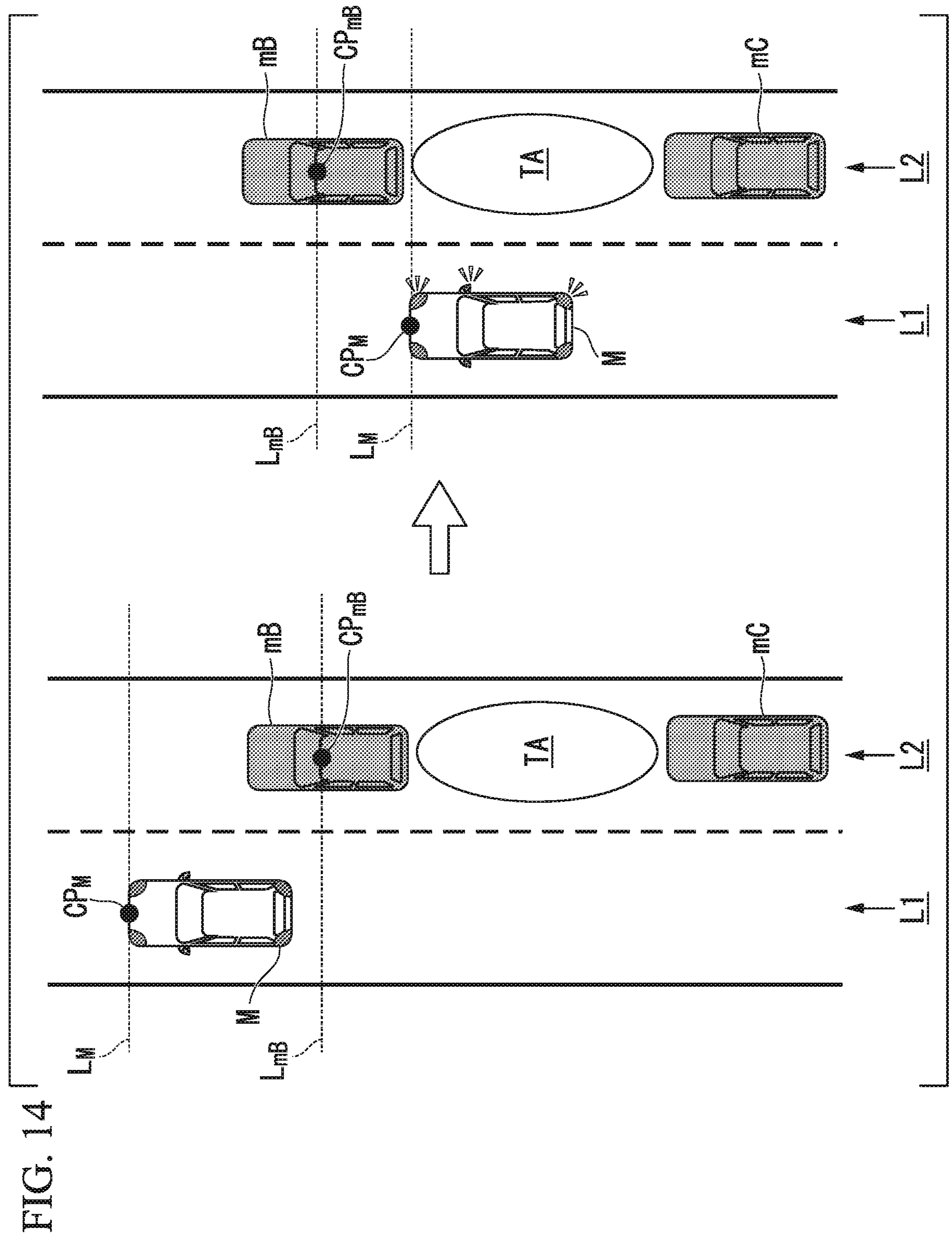
FIG. 14 is a figure showing an example of a scene in which a target area is set at rear of the host vehicle.

FIG. 14 is a figure showing an example of a scene in which the target area TA is set at rear of the host vehicle M. In the scene shown in FIG. 14, the direction indicators TL are operated at a timing in which the reference position $CP_M$ of the host vehicle M coincides with the reference position $CP_{mB}$ of the preceding reference vehicle mB or a timing in which the reference position $CP_{mB}$ of the preceding reference vehicle mB is present in front of the reference position $CP_M$ of the host vehicle M. In this case, the reference position $CP_M$ of the host vehicle M may be the direction indicator TL2 on the right front side.

As shown in FIG. 14, for example, the operation timing determining part 181 assumes the reference line $L_{mB}$ and the reference line $L_M$ virtually extending from the reference position $CP_{mB}$ of the preceding reference vehicle mB in the lane width direction, and determines an operation timing from a position relation of the reference lines.

The direction indicator controller 180 can suppress, for example, a situation in which lighting of the direction indicators TL cannot be easily recognized by a driver in the preceding reference vehicle mB and a misunderstanding by a driver of the preceding reference vehicle mB that the host vehicle intends to interrupt in front of the preceding reference vehicle mB, by operating the direction indicators TL at a timing when the reference line $L_M$ coincides with the reference line $L_{mB}$ or a timing when the reference line $L_M$ is present at rear of the reference line $L_{mB}$.

Next, the operation continuation determination part 182 determines whether the lane change is terminated (FIG. 12: step S210). When the lane change is terminated, the operation controller 183 turns off the operated direction indicators TL (step S212).

Meanwhile, when the lane change is not terminated, the operation continuation determination part 182 determines whether the target area TA is reset by the lane change controller 154 (step S214).

When the target area TA is not reset, the operation continuation determination part 182 determines that the lane change event is changed to another event or the driving mode is switched to the automated driving mode, and performs the above-mentioned processing in S212 on the operation controller 183.

Meanwhile, when the target area TA is reset, the operation continuation determination part 182 determines that the operation is continued (step S216), and returns to the above-mentioned processing in S200. Accordingly, the processing of the flowchart is terminated.

Figure 15:
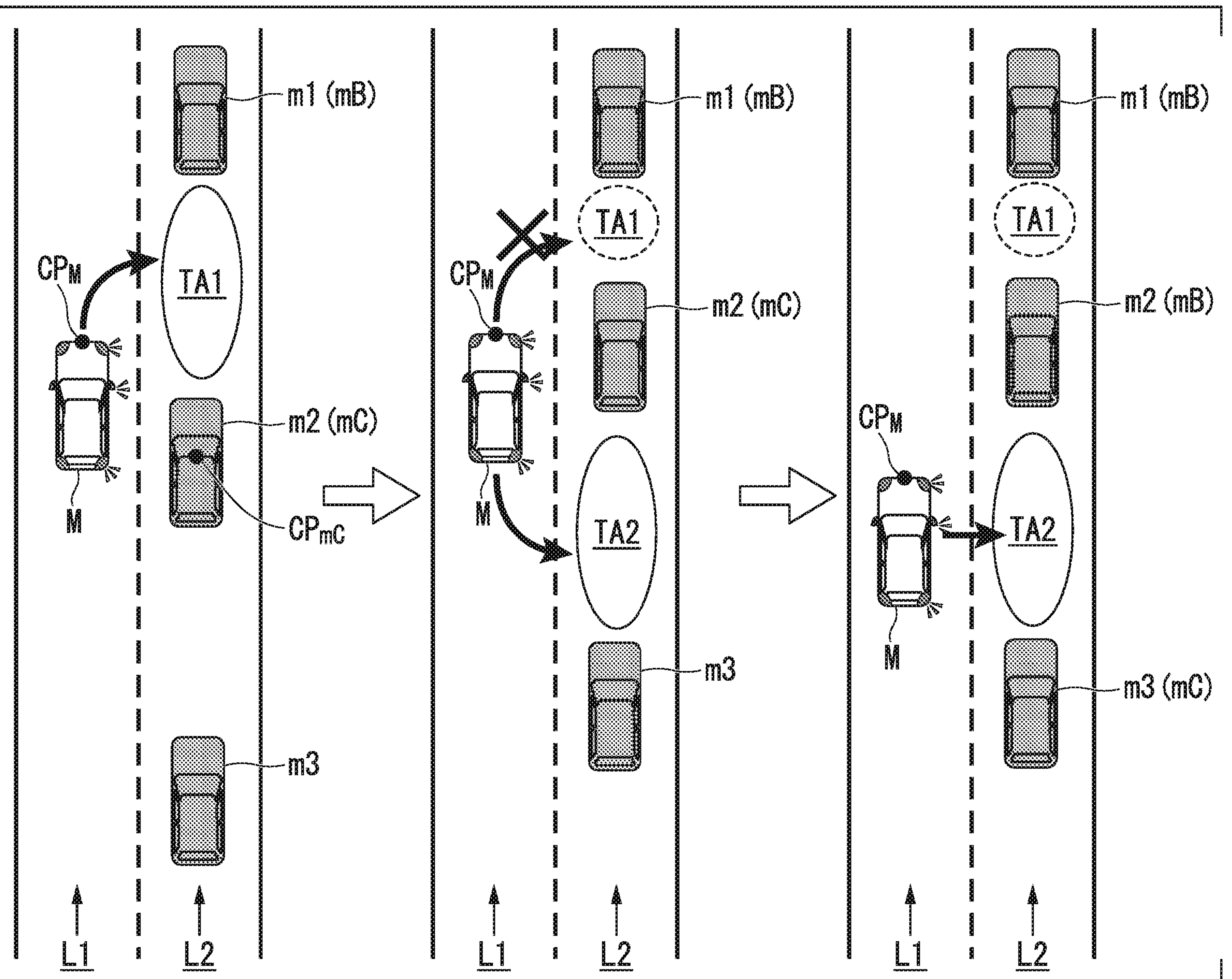
FIG. 15 is a figure showing an example of a scene in which an operation of a direction indicator is continued.

FIG. 15 is a figure showing an example of a scene in which operations of the direction indicators TL are continued. As shown in FIG. 15, for example, in a circumstance in which three vehicles m1, m2 and m3 are present on the adjacent lane L2, when it is determined by the lane change controller 154 that the target area TA1 is set between the vehicle m1 and the vehicle m2 and the lane change with respect to the target area TA1 is possible, the traveling controller 160 causes the host vehicle M to travel toward the target area TA1 by controlling the driving force output apparatus 90, the steering apparatus 92 and the brake apparatus 94.

Here, the direction indicator controller 180 operates the direction indicators TL and gives an interruption intention to a driver in the vehicle m2 when the reference position $CP_M$ of the host vehicle M overtakes the reference position $CP_{mC}$ of the vehicle m2 that is the following reference vehicle mC.

However, in such a circumstance, for example, the vehicle m2 may accelerated and a sufficient inter-vehicle distance between the vehicle m1 and the vehicle m2 cannot be secured. In this case, for example, as shown in FIG. 15, the lane change controller 154 resets a new target area TA2 between the vehicle m2 and the vehicle m3.

When it is determined that the lane change with respect to the target area TA2 is possible, the direction indicator controller 180 continues the operations of the direction indicators TL.

Accordingly, the vehicle control system 100 can give an intention of changing the lane to a driver of a surrounding vehicle by operating the direction indicators TL all the time while the host vehicle M is traveling toward the target area TA2. As a result, possibility of changing the lane of the host vehicle M to the adjacent lane L2 can be improved.

According to the above-mentioned embodiment, a timing when the direction indicators TL are operated is determined on the basis of a relative position between the preceding reference vehicle mB that is traveling in front of the target area TA or the following reference vehicle mC that is traveling at rear of the target area TA and the host vehicle M. For this reason, an advance notice for the lane change can be performed at an appropriate timing.

In addition, according to the above-mentioned embodiment, the direction indicators TL are operated at a timing when the reference position $CP_M$ of the host vehicle M coincides with the reference position $CP_{mC}$ of the following reference vehicle mC or a timing when the reference position $CP_{mC}$ of the following reference vehicle mC is present at rear of the reference position $CP_M$ of the host vehicle M. For this reason, the host vehicle M can give an intention to interrupt in front of the following reference vehicle mC to a driver in the following reference vehicle mC, and can kindly care the driver in the following reference vehicle mC.

In addition, according to the above-mentioned embodiment, the direction indicators TL are operated at a timing when the reference position $CP_M$ of the host vehicle M coincides with the reference position $CP_{mB}$ of the preceding reference vehicle mB or a timing when the reference position $CP_{mB}$ of the preceding reference vehicle mB is present in front of the reference position $CP_M$ of the host vehicle M. For this reason, a situation in which lighting of the direction indicators TL cannot be easily recognized by a driver in the preceding reference vehicle mB and a misunderstanding by a driver of the preceding reference vehicle mB that the host vehicle intends to interrupt in front of the preceding reference vehicle mB can be suppressed.

In addition, according to the above-mentioned embodiment, the direction indicators TL are not turned off even when the lane change with respect to one target area TA is not possible, and the direction indicators TL are operated continuously even while it is determined whether the lane change with respect to another target area TA is performed. For this reason, reliability of the lane change can be enhanced.

<First Variant>

Hereinabove, a first variant of the above-mentioned embodiment will be described. The above-mentioned operation timing determining part 181 changes a setting position of the reference position $CP_{mB}$ on the basis of a relative speed between the host vehicle M and the preceding reference vehicle mB.

In addition, the operation timing determining part 181 changes a setting position of the reference position $CP_{mC}$ on the basis of a relative speed between the host vehicle M and the following reference vehicle mC.

Figure 16:
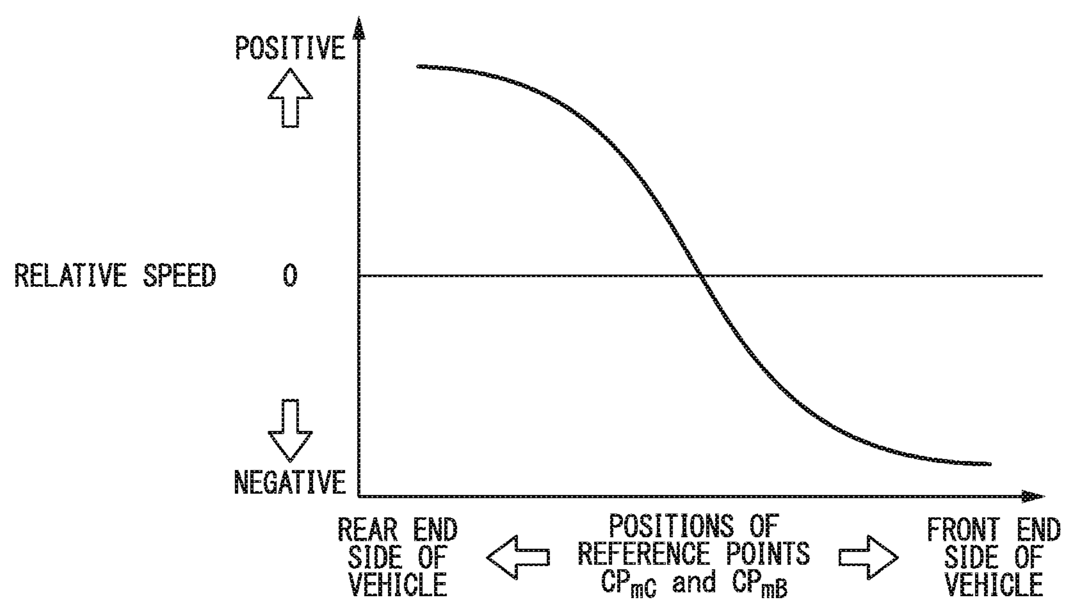
FIG. 16 is a figure for explaining a method of determining a setting position of a reference position.

FIG. 16 is a figure for explaining a method of determining setting positions of the reference positions $CP_{mB}$ and $CP_{mC}$. In FIG. 16, a horizontal axis represents setting positions of the reference positions $CP_{mB}$ and $CP_{mC}$, and a vertical axis represents a relative speed between a speed $V_M$ of the host vehicle M and a speed $V_{mB}$ of the preceding reference vehicle mB or a speed $V_{mC}$ of the following reference vehicle mC.

For example, when the host vehicle M is traveling at rear of the following reference vehicle mC, the reference position $CP_{mC}$ is set so as to approach closer to a rear end side of the following reference vehicle mC as the speed $V_M$ of the host vehicle M is larger than the speed $V_{mC}$ of the following reference vehicle mC.

In other words, in a scene in which the host vehicle M is accelerated, the operation timing determining part 181 sets the reference position $CP_{mC}$ so as to approach closer to the rear end side of the following reference vehicle mC as a relative speed of the host vehicle M with respect to the following reference vehicle mC increases as a positive value. Accordingly, the direction indicator controller 180 operates the direction indicators TL at an early timing when the host vehicle M overtakes the following reference vehicle mC.

As a result, the direction indicator controller 180 can cause the driver in the following reference vehicle mC to more reliably recognize the lighting of the direction indicators TL even when a recognized position error of the following reference vehicle mC is increased as the relative speed is increased.

In addition, when the host vehicle M is traveling in front of the preceding reference vehicle mB, the reference position $CP_{mB}$ is set so as to approach closer to the front end side of the preceding reference vehicle mB as the speed $V_M$ of the host vehicle M is smaller than the speed $V_{mB}$ of the preceding reference vehicle mB.

In other words, in a scene in which the host vehicle M is decelerated or a scene in which a speed is maintained, the operation timing determining part 181 sets the reference position $CP_{mB}$ so as to approach closer to the front end side of the preceding reference vehicle mB as the relative speed of the host vehicle M with respect to the preceding reference vehicle mB increases as a negative value. Accordingly, for example, when the host vehicle M passes the preceding reference vehicle mB, in the case in which a speed difference between the speed $V_M$ of the host vehicle M and the speed $V_{mB}$ of the preceding reference vehicle mB is small, since the reference position $CP_{mB}$ is set to the rear end side of the preceding reference vehicle mB, the direction indicators TL are turned on further at rear of than the position of the driver in the preceding reference vehicle mB.

As a result, the driver in the preceding reference vehicle mB will be difficult to recognize the lighting of the direction indicators TL.

Meanwhile, when the speed difference between the speed $V_M$ of the host vehicle M and the speed $V_{mB}$ of the preceding reference vehicle mB is large, the direction indicators TL are operated in front of the position of the driver in the preceding reference vehicle mB. In this case, since the preceding reference vehicle mB is faster than the host vehicle M, the intention of the lane change of the host vehicle M tends to be ignored, and the direction indicators TL can be operated earlier without giving misunderstanding that the host vehicle intends to interrupt in front of the preceding reference vehicle mB.

<Second Variant>

Hereinafter, a second variant of the above-mentioned embodiment will be described. The above-mentioned operation timing determining part 181 determines to operate the direction indicators TL5 and TL6 on the rear end side of the host vehicle M when an inter-vehicle distance between the preceding reference vehicle mB and the following reference vehicle mC after the operation of the direction indicators TL gets larger than that before the operation of the direction indicators TL, and after the lane change between the vehicles has performed.

Figure 17:
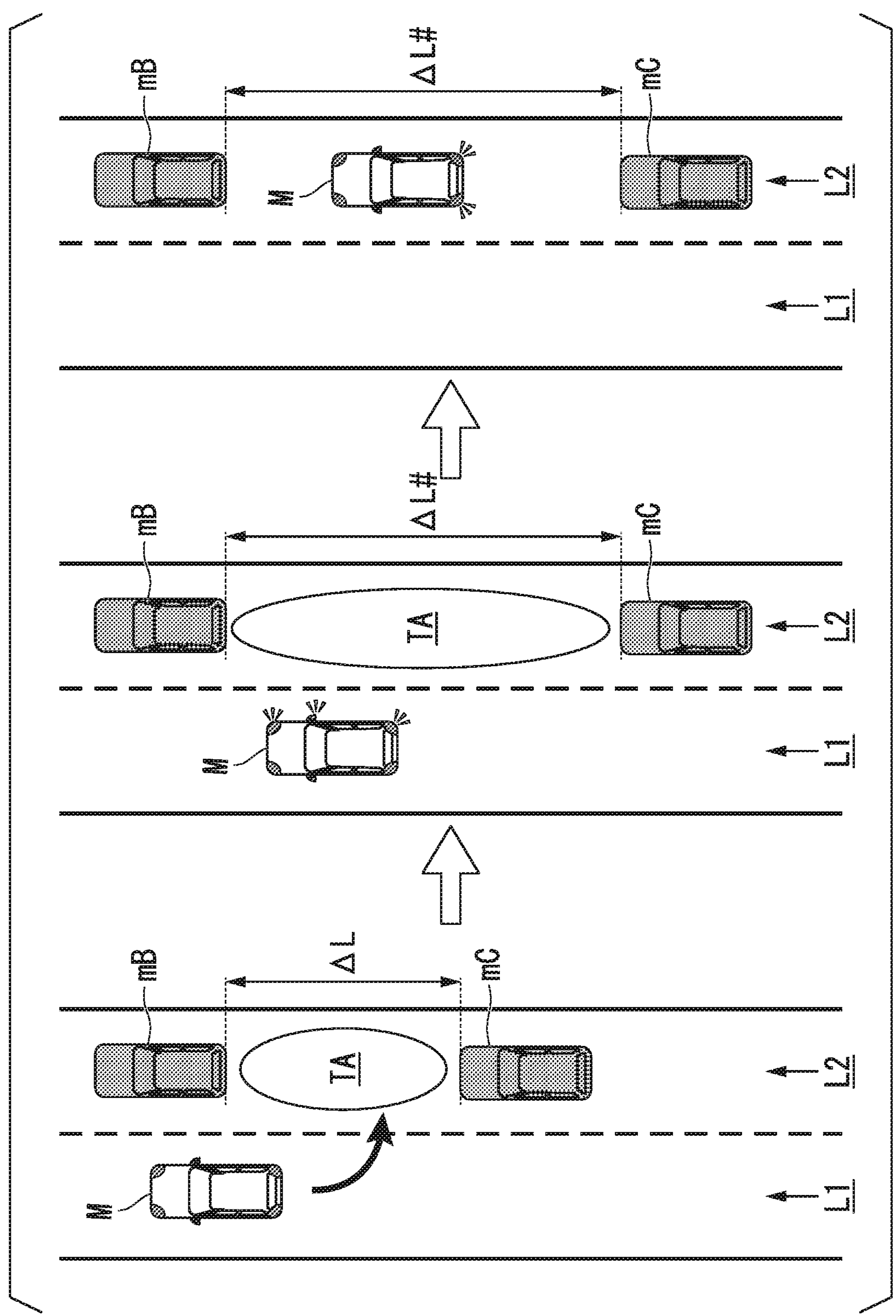
FIG. 17 is a figure showing an example of a scene in which an inter-vehicle distance between a preceding reference vehicle and a following reference vehicle is increased.

FIG. 17 is a figure showing an example of a scene when an inter-vehicle distance between the preceding reference vehicle mB and the following reference vehicle mC is increased. ΔL in FIG. 17 represents an inter-vehicle distance before the direction indicators TL are operated, and ΔL # represents an inter-vehicle distance after the direction indicators TL are operated. As shown in FIG. 17, when the inter-vehicle distance is increased before and after the operation of the direction indicators TL, the direction indicator controller 180 operates the direction indicators TL5 and TL6 after the lane change in front of the following reference vehicle mC has performed.

Accordingly, the vehicle control system 100 can give an intention of appreciation to the driver in the following reference vehicle mC.

Hereinabove, while the present invention has been described with reference to the above-mentioned embodiments, the present invention is not limited to the above-mentioned embodiments and various modifications and substitutions may be made without departing from the scope of the present invention.

REFERENCE SIGNS LIST

20 Finder
30 Radar
40 Camera
50 Navigation device
60 Vehicle sensor
62 Display
64 Speaker
70 Operation device
72 Operation detecting sensor
80 Selector switch
90 Driving force output apparatus
92 Steering apparatus
94 Brake apparatus
TL Direction indicator
100 Vehicle control system
110 Target lane determining part
120 Automated driving controller
122 Host vehicle position recognition part
130 Outside recognition part
140 Action plan generating part
150 Trajectory generating part
151 Traveling state determining unit
152 Trajectory candidate generating part
153 Evaluation/selection part
154 Lane change controller
160 Traveling controller
170 Switching controller
180 Direction indicator controller
181 Operation timing determining part
182 Operation continuation determination part
183 Operation controller
190 Storage
M Host vehicle

What is claim is:

1. A vehicle control system comprising:

a controller that sets a target area, and that executes a lane change of a host vehicle toward the set target area, the target area being an area which is a target for the host vehicle when performing the lane change to an adjacent lane which is adjacent to an own traffic lane on which the host vehicle is traveling; and a direction indicator controller that determines a timing for operating a direction indicator installed on the host vehicle on the basis of a relative relationship between the host vehicle and a vehicle that is traveling in front of or at rear of the target area set by the controller, and that operates the direction indicator on the basis of the timing, wherein, in a case the target area set by the controller is present at rear of a reference position of the host vehicle, the direction indicator controller determines a timing to operate the direction indicator to a timing or after in which a position of the direction indicator provided at a rear end of the host vehicle becomes rearward than a reference position of a vehicle which is traveling in front of the target area in an advance direction of the host vehicle, the reference position of the vehicle traveling in front of the target area being a position of a driver.

2. The vehicle control system according to claim 1, wherein the direction indicator controller determines to operate the direction indicator on the rear side of the host vehicle among the direction indicators in a case an inter-vehicle distance between the vehicle traveling in front of the target area and the vehicle traveling at rear of the target area gets larger than before the operation of the direction indicator and further, after the lane change to the target area is terminated.

3. A vehicle control system comprising:

a controller that sets a target area, and that executes a lane change of a host vehicle toward the set target area, the target area being an area which is a target for the host vehicle when performing the lane change to an adjacent lane which is adjacent to an own traffic lane on which the host vehicle is traveling; and a direction indicator controller that determines a timing for operating a direction indicator installed on the host vehicle on the basis of a relative relationship between the host vehicle and a vehicle that is traveling in front of or at rear of the target area set by the controller, and that operates the direction indicator on the basis of the timing, wherein, in a case the target area set by the controller is present in front of a reference position on the host vehicle, the direction indicator controller determines a timing to operate the direction indicator to a timing or after in which a position of the direction indicator provided at a front end of the host vehicle becomes forward than a reference position of a vehicle which is traveling at rear of the target area in the advance direction of the host vehicle, the reference position of the vehicle traveling at rear of the target area being a position of a driver.

4. The vehicle control system according to claim 3, wherein the direction indicator controller determines to operate the direction indicator on the rear side of the host vehicle among the direction indicators in a case an inter-vehicle distance between the vehicle traveling in front of the target area and the vehicle traveling at rear of the target area gets larger than before the operation of the direction indicator and further, after the lane change to the target area is terminated.

5. A vehicle control system comprising:

a controller that sets a target area, and that executes a lane change of a host vehicle toward the set target area, the target area being an area which is a target for the host vehicle when performing the lane change to an adjacent lane which is adjacent to an own traffic lane on which the host vehicle is traveling; and a direction indicator controller that determines a timing for operating a direction indicator installed on the host vehicle on the basis of a relative relationship between the host vehicle and a vehicle that is traveling in front of or at rear of the target area set by the controller, and that operates the direction indicator on the basis of the timing, wherein the controller determines whether the lane change of the host vehicle to the set target area is possible, and when it is determined that the lane change is not possible, changes the target area to in front of the vehicle traveling in front of the set target area or to at rear of the vehicle traveling at rear of the set target area, and when the target area is changed by the controller, the direction indicator controller determines to continuously operate the direction indicator installed on the host vehicle until the lane change of the host vehicle with respect to the changed target area is terminated.

6. The vehicle control system according to claim 5, wherein the direction indicator controller operates the direction indicator installed on the host vehicle in a case a lane change is performed by the controller.

7. The vehicle control system according to claim 6, wherein the direction indicator controller operates the direction indicator installed on the host vehicle in a case a lane change is performed by the controller.

8. The vehicle control system according to claim 7, wherein the direction indicator controller operates the direction indicator installed on the host vehicle in a case a lane change is performed by the controller.

9. The vehicle control system according to claim 7, wherein the direction indicator controller changes a reference position of a vehicle that is traveling in front of or at rear of the target area on the basis of a speed of the host vehicle and a speed of the vehicle that is traveling in front of or at rear of the target area.

10. The vehicle control system according to claim 9, wherein the direction indicator controller sets the reference position for the vehicle traveling at rear of the target area so as to approach closer to a rear end side of the vehicle traveling at rear of the target area as a relative speed of the host vehicle with respect to a speed of the vehicle traveling at rear of the target area increases.

11. The vehicle control system according to claim 9, wherein the direction indicator controller sets the reference position for the vehicle traveling in front of the target area so as to approach closer to a front end side of the vehicle traveling in front of the target area as a relative speed of the host vehicle with respect to the vehicle traveling in front of the target area increases as a negative value.

12. The vehicle control system according to claim 6, wherein the direction indicator controller changes a reference position of a vehicle that is traveling in front of or at rear of the target area on the basis of a speed of the host vehicle and a speed of the vehicle that is traveling in front of or at rear of the target area.

13. The vehicle control system according to claim 12, wherein the direction indicator controller sets the reference position for the vehicle traveling at rear of the target area so as to approach closer to a rear end side of the vehicle traveling at rear of the target area as a relative speed of the host vehicle with respect to a speed of the vehicle traveling at rear of the target area increases.

14. The vehicle control system according to claim 12, wherein the direction indicator controller sets the reference position for the vehicle traveling in front of the target area so as to approach closer to a front end side of the vehicle traveling in front of the target area as a relative speed of the host vehicle with respect to the vehicle traveling in front of the target area increases as a negative value.

15. The vehicle control system according to claim 5, wherein the direction indicator controller changes a reference position of a vehicle that is traveling in front of or at rear of the target area on the basis of a speed of the host vehicle and a speed of the vehicle that is traveling in front of or at rear of the target area.

16. The vehicle control system according to claim 15, wherein the direction indicator controller sets the reference position for the vehicle traveling at rear of the target area so as to approach closer to a rear end side of the vehicle traveling at rear of the target area as a relative speed of the host vehicle with respect to a speed of the vehicle traveling at rear of the target area increases.

17. The vehicle control system according to claim 15, wherein the direction indicator controller sets the reference position for the vehicle traveling in front of the target area so as to approach closer to a front end side of the vehicle traveling in front of the target area as a relative speed of the host vehicle with respect to the vehicle traveling in front of the target area increases as a negative value.

18. The vehicle control system according to claim 5, wherein the direction indicator controller determines to operate the direction indicator on the rear side of the host vehicle among the direction indicators in a case an inter-vehicle distance between the vehicle traveling in front of the target area and the vehicle traveling at rear of the target area gets larger than before the operation of the direction indicator and further, after the lane change to the target area is terminated.

* * * * *